United States Patent
Murakami et al.

(10) Patent No.: US 6,491,442 B1
(45) Date of Patent: Dec. 10, 2002

(54) OPTICAL FIBER CONNECTOR IN WHICH AN OPTICAL FIBER IS PROTECTED EVEN WHEN CONNECTION IS NOT MADE

(75) Inventors: Keiji Murakami, Oume; Makoto Yamashita, Hamura; Jun Takeda, Kokubunji; Yasuhiro Ando, Hoya; Nobuo Sato, Tanashi; Mitsuo Usui, Tokyo; Kohsuke Katsura, Hachioji, all of (JP)

(73) Assignee: Japan Aviation Electronics Industry, Tokyo (JP)

( * ) Notice: Subject to any disclaimer, the term of this patent is extended or adjusted under 35 U.S.C. 154(b) by 0 days.

(21) Appl. No.: 09/344,881

(22) Filed: Jun. 29, 1999

(30) Foreign Application Priority Data

Jun. 29, 1998 (JP) ............................................ 10/182156
Jun. 29, 1998 (JP) ............................................ 10/182367
Jun. 30, 1998 (JP) ............................................ 10/183633

(51) Int. Cl.[7] ............................................... G02B 6/38
(52) U.S. Cl. ............................. 385/58; 385/59; 385/65
(58) Field of Search ............................. 385/59, 60, 63, 385/65, 83, 54, 47, 71, 95–98, 114, 136, 134, 137

(56) References Cited

U.S. PATENT DOCUMENTS

| | | | | |
|---|---|---|---|---|
| 4,218,113 A | * | 8/1980 | Uberbacher | 350/96.21 |
| 5,095,514 A | * | 3/1992 | Curtis | 385/12 |
| 5,096,276 A | * | 3/1992 | Gerace et al. | 385/76 |
| 5,136,672 A | * | 8/1992 | Mulholland et al. | 385/53 |
| 5,506,921 A | * | 4/1996 | Horie | 385/53 |
| 5,545,892 A | * | 8/1996 | Bilinski et al. | 250/231.12 |
| 5,557,060 A | * | 9/1996 | Okada et al. | 118/661 |
| 5,694,506 A | | 12/1997 | Kobayashi et al. | 385/60 |
| 5,724,332 A | * | 3/1998 | Ogusu | 369/77.2 |
| 5,861,182 A | * | 1/1999 | Takizawa | 425/557 |
| 5,946,788 A | * | 9/1999 | Griffioen et al. | 29/433 |

FOREIGN PATENT DOCUMENTS

| | | | | |
|---|---|---|---|---|
| FR | 2464490 | * | 8/1979 | G02B/7/26 |
| FR | 2 464 490 | | 3/1981 | G02B/7/26 |
| WO | WO 94/04954 | | 3/1994 | G02B/6/38 |

OTHER PUBLICATIONS

M. Kobayashi et al., "Patterned Optical Ribbon Fibre with Fibre Physical Contact Connector for Optical Fibre Interconneciton", Electronics Letters, vol. 33, No. 20, Sep. 25, 1997, pp. 1728–1730.

* cited by examiner

Primary Examiner—Frank G. Font
Assistant Examiner—Michael P. Mooney
(74) Attorney, Agent, or Firm—Michael Best & Friedrich LLC

(57) ABSTRACT

In an optical fiber connector (1), an outer member (2) holds a portion of an optical fiber (4A) remote from its connecting end which is connectable to a connecting end of a counterpart optical fiber. An aligning member (3) is held by the outer member so as to be movable along the optical fiber. The aligning member carries out positioning of the connecting end of the optical fiber. The aligning member is urged by a spring (5) in a direction to project from the outer member. When connecting the optical fiber to the counterpart optical fiber, the aligning member is moved in a direction opposite to the foregoing direction against an urging force applied by the spring so that the connecting end of the optical fiber is projected from the aligning member.

15 Claims, 33 Drawing Sheets

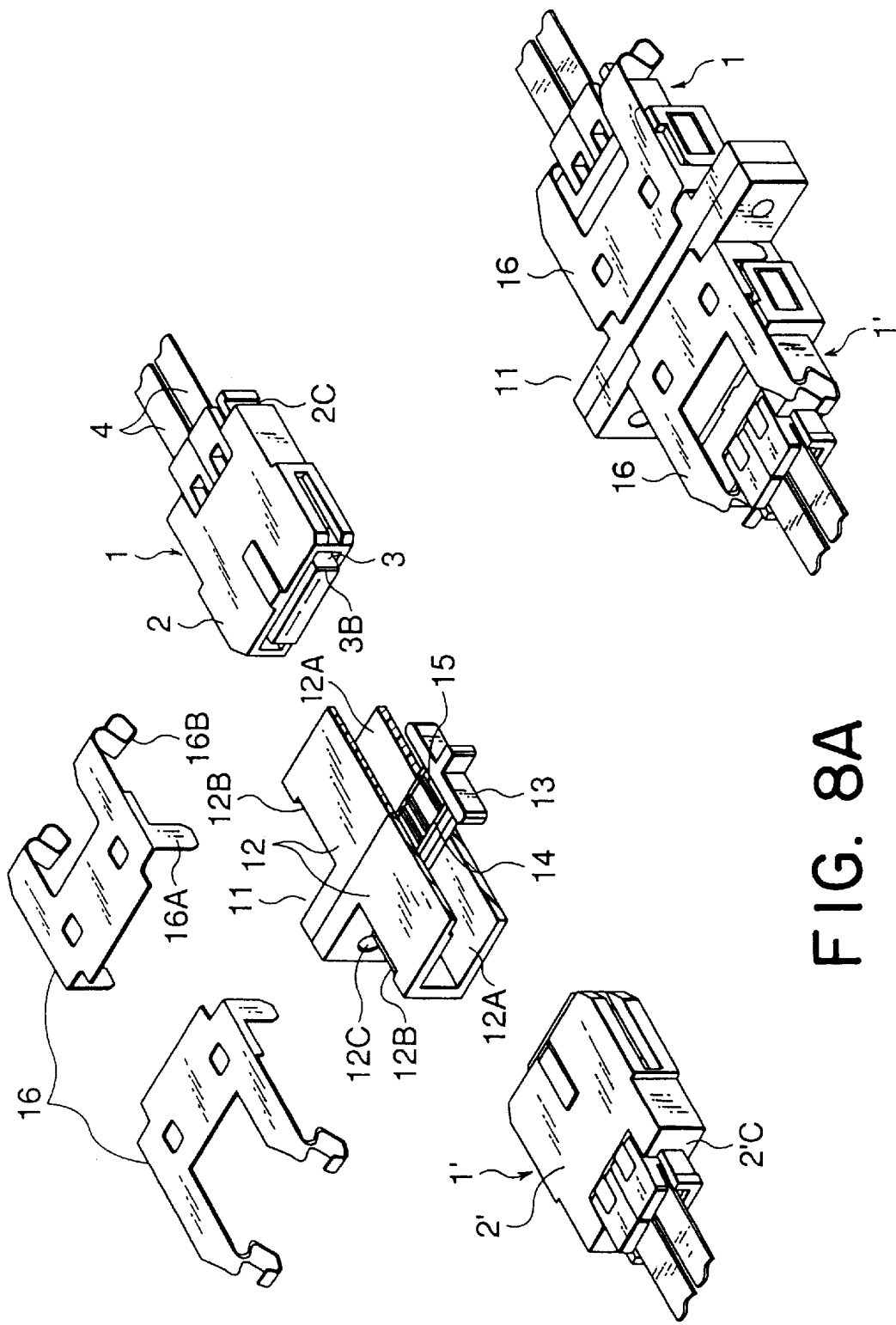

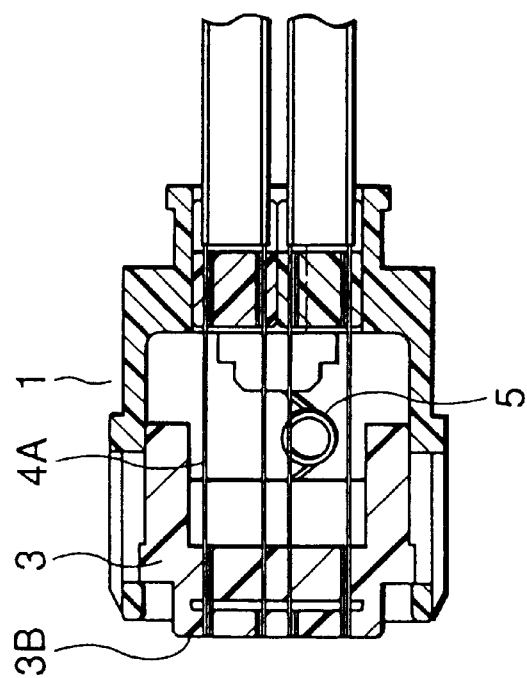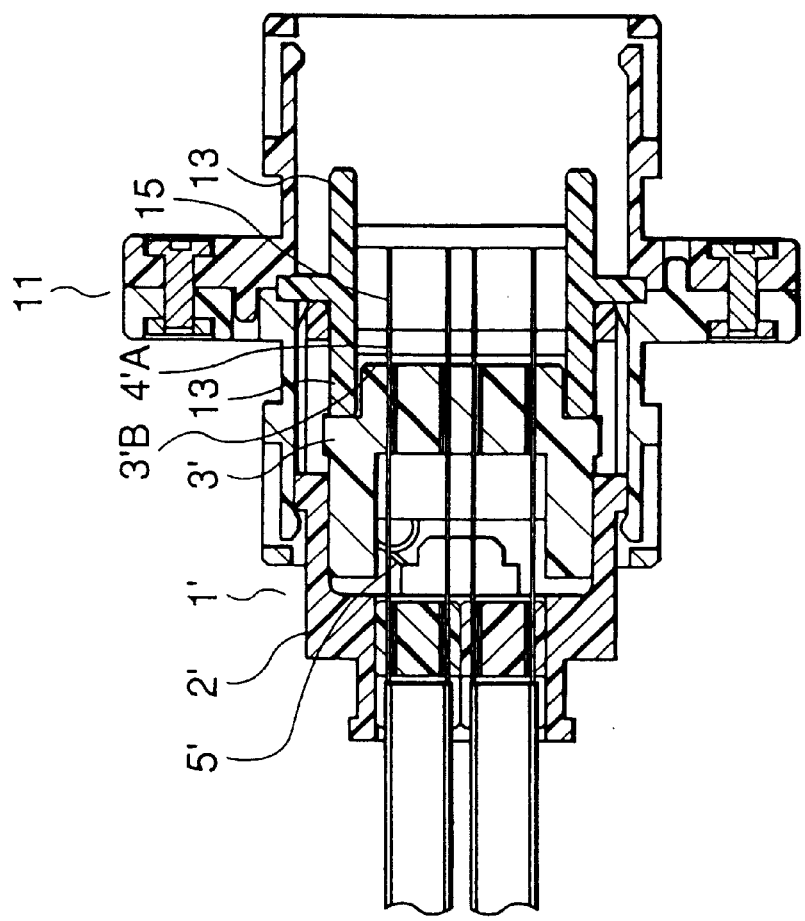
FIG. 12

US 6,491,442 B1

OPTICAL FIBER CONNECTOR IN WHICH AN OPTICAL FIBER IS PROTECTED EVEN WHEN CONNECTION IS NOT MADE

BACKGROUND OF THE INVENTION

The present invention relates to an optical fiber connector for connection between optical fibers.

For a better understanding of the present invention, description will be made at first as regards a first and a second conventional optical fiber connector.

Referring to FIG. 1, the first conventional optical fiber connector is of a plug-adapter-plug type for connecting plugs 30 and 30' via an adapter 40. The plug 30 comprises an outer member 31, an optical fiber aligning base plate 32 having a number of V-grooves, a pair of optical fiber guides 33 each having a number of V-grooves, an optical fiber aligning guide 34, a rear shell 35, a pair of plate springs 36 provided at both sides of the rear shell 35 for pressing the optical fiber aligning guide 34, and an optical fiber bunch 37.

The optical fiber aligning base plate 32 and the optical fiber guides 33 are disposed in the optical fiber aligning guide 34. The optical fiber bunch 37 is formed by aligning optical fibers 37A in parallel. The optical fibers 37A are inserted from a side of the rear shell 35, then pass on the V-grooves of the optical fiber aligning base plate 32 and between the V-grooves of the pair of optical fiber guides 33 so as to be projected from an end surface 31A of the outer member 31. The plug 30' has the same structure as the plug 30.

The adapter 40 comprises a pedestal holder 41, a pair of blocks 42 provided at both sides of the center of the holder 41, a micro-sleeve retaining base plate 43 having a number of V-grooves, a number of micro-sleeves 44 parallelly arranged on the micro-sleeve retaining base plate 43, an aligning plate spring 45 symmetrically provided on an upper surface of each of the blocks 42, and a guide holding plate spring 46 symmetrically provided on a side of each of the blocks 42.

When the plugs 30 and 30' are fitted to the adapter 40 from both sides thereof, the optical fibers 37A and 37'A are inserted into the corresponding micro-sleeves 44 from both sides thereof so that end surfaces of the optical fibers 37A and 37'A abut each other to be connected.

Referring now to FIGS. 2 to 4, the second conventional optical fiber connector is of a plug-receptacle type for connecting a plug 50 to a receptacle 70. The plug 50 comprises a plug frame 60, an optical fiber bunch 52 formed by parallelly aligning a number of optical fibers 52A, a first base plate 53 having a number of V-grooves, a second base plate 54 having a number of V-grooves, a V-groove guide 55, a clamping presser plate 56, contractile tubes 57 for covering the optical fibers, a rear shell 59, a pair of plate springs 58 provided at both sides of the rear shell 59 for pressing the V-groove guide 55, and an optical fiber fixing base plate 61.

The first and second base plates 53 and 54 are disposed in the V-groove guide 55. Since the first and second base plates 53 and 54 and the V-groove guide 55 cooperatively align the optical fibers 52A, they are generically called an optical fiber aligning member 65.

The receptacle 70 comprises a shell 75, a V-groove guide 73 having a ]-shape in section, a V-groove base plate 72 disposed in the V-groove guide 73 and having a number of V-grooves, a number of micro-sleeves 71 aligned on the V-groove base plate 72, optical fibers 77 received in the corresponding micro-sleeves 71, and a presser plate 76.

The plug 50 is fitted to the receptacle 70 and then fixed by a fixing spring 78. The plug frame 60 is attached to the V-groove guide 73 so that the optical fibers 52A are inserted into the micro-sleeves 71. In the micro-sleeves 71, end surfaces of the optical fibers 52A come in abutment with end surfaces of the corresponding optical fibers 77 so as to be connected to each other.

In the first conventional optical fiber connector, it is necessary that the ends of the optical fibers 37A be projected beyond the end surface 31A of the outer member 31 as shown in FIG. 1A. On the other hand, in the second conventional optical fiber connector, the ends of the optical fibers 52A may be retreated from an end surface 60A of the plug frame 60 as shown in FIG. 3. However, since the optical fibers 37A and 52A are exposed to the exterior both in the first and second conventional optical fiber connectors, they are highly liable to be damaged.

Further, since the optical fibers 37A and 52A in the plugs 30 and 50 are subjected to positioning in the aligning members 44 and 71 of the adapter 40 and the receptacle 70 and then connected to the optical fibers 37'A and 77, respectively, it is necessary that the optical fibers 37A and 52A be projected from an end surface 34A of the optical fiber aligning guide 34 and an end surface 55A of the V-groove guide 55 at least by about 2 to 3 mm.

For example, for realizing a multi-fiber connector of 0.25 mm pitch, the accuracy required for positioning between each optical fiber in a plug and an aligning member of an adapter or receptacle is about 0.1 mm (0.05 mm on one side).

When performing the positioning between each optical fiber and the aligning member, a positional error is caused in a pitch direction or in a direction perpendicular to the pitch direction due to dimensional dispersion of the respective portions of the optical fiber connector. This positional error has been dealt with by improving the dimensional accuracy of the parts, thereby resulting in increased producing cost of the optical fiber connector.

SUMMARY OF THE INVENTION

It is therefore an object of the present invention to provide an optical fiber connector which has a structure for protecting an optical fiber and is capable of facilitating positioning between the optical fiber and an aligning member thereby to reduce the producing cost thereof.

It is another object of the present invention to provide an optical fiber connector which can stably perform positioning between an optical fiber and an adapter.

It is another object of the present invention to provide an optical fiber connector which can easily select bending or non-bending of an optical fiber.

Other objects of the present invention will become clear as the description proceeds.

According to one aspect of the present invention, there is provided an optical fiber connector for connecting an optical fiber to a counterpart optical fiber by abutting a connecting end of the optical fiber against a connecting end of the counterpart optical fiber in a given direction while bending of the optical fiber is caused at a portion thereof, the connector comprising an outer member which holds a portion of the optical fiber remote from the connecting end of the optical fiber, an aligning member which is held by the outer member so as to be movable in the given direction and in a direction opposite to the given direction, the aligning member positioning the connecting end of the optical fiber, and an urging member which urges the aligning member in the given direction, the aligning member being moved, when connecting the optical fiber to the counterpart optical fiber, in the direction opposite to the given direction against an urging force applied by the urging member so that the connecting end of the optical fiber is projected from the aligning member.

It may be arranged that a connecting-side end surface of the aligning member is located on the same plane as a connecting-side end surface of the outer member before connecting the optical fiber to the counterpart optical fiber.

It may be arranged that a connecting-side end surface of the aligning member is projected from a connecting-side end surface of the outer member before connecting the optical fiber to the counterpart optical fiber.

It may be arranged that the connecting end of the optical fiber is retreated from an connecting-side end surface of the aligning member before connecting the optical fiber to the counterpart optical fiber.

It may be arranged that the urging member is made of metal.

It may be arranged that the urging member is made of resin.

It may be arranged that the urging member has a shape of a torsion coil.

It may be arranged that the urging member has a shape of an expansion coil.

It may be arranged that the urging member has a plate shape.

It may be arranged that the optical fiber connector further comprises an adapter to be fitted to the outer member, wherein the adapter comprises an aligning member for receiving therein the connecting end of the optical fiber for alignment thereof and, upon fitting of the outer member and the adapter, the adapter moves the aforementioned aligning member in the direction opposite to the given direction against the urging force applied by the urging member.

It may be arranged that the adapter is guided by an inner periphery of the outer member when moving the aforementioned aligning member in the direction opposite to the given direction.

It may be arranged that the optical fiber connector further comprises a fitting piece which is attached to the outer member so as to contact the optical fiber to control the bending of the optical fiber.

It may be arranged that the fitting piece is detachable relative to the outer member.

It may be arranged that the fitting piece has an elastic member which contacts the optical fiber.

According to another aspect of the present invention, there is provided an optical fiber connector comprising a first optical connector plug and an adapter for connecting the first optical connector plug to a second optical connector plug, the first optical connector plug comprising an outer member which holds an optical fiber, a first aligning member which performs positioning of the optical fiber at a connecting-side end of the outer member, and a spring which urges the first aligning member in a first direction, the adapter comprising a second aligning member which receives a connecting end of the optical fiber for alignment thereof, the second aligning member being moved, upon fitting of the first optical connector plug and the adapter, along an inner periphery of the outer member to a given position in a second direction opposite to the first direction and then pushes the first aligning member to slide it in the second direction, so that the optical fiber in the first connector plug is inserted into the second aligning member for connection.

According to still another aspect of the present invention, there is provided an optical fiber connector comprising a first and a second optical connector plug each having an optical fiber and an adapter for connecting the first and second optical connector plugs via the adapter, wherein a contact force between an end surface of the optical fiber of the first optical connector plug and an end surface of the optical fiber of the second optical connector plug is obtained from a buckling load caused by bending of at least one of the optical fibers, each of the first and second optical connector plugs comprising a clamp member which firmly holds a first portion of the optical fiber other than a tip portion thereof including the end surface, a first outer member which holds the clamp member, and a fitting piece which is detachably held by the first outer member, the adapter comprising an aligning member which slidably holds the tip portion of the optical fiber, and a second outer member which holds the aligning member, the fitting piece having one of a first shape which presses a second portion of the optical fiber between the first portion and the tip portion when the fitting piece is held by the first outer member, and a second shape which does not press the second portion of the optical fiber when the fitting piece is held by the first outer member.

BRIEF DESCRIPTION OF THE DRAWING

FIGS. 1A to 1C are perspective views of a first conventional optical fiber connector, wherein FIG. 1A shows one of optical connector plugs, FIG. 1B shows the other optical connector plug and FIG. 1C shows an adapter;

FIGS. 7A and 7B are partly-sectioned perspective views contrastively showing two states of the optical connector plug shown in FIG. 5, wherein FIG. 7A shows the state before fitting and FIG. 7B shows the state after fitting;

FIGS. 8A and 8B are partly-sectioned perspective views, wherein the optical connector plugs each having the structure shown in FIG. 5 are connected in a plug-adapter-plug fashion and wherein FIG. 8A shows the state before fitting and FIG. 8B shows the state after fitting;

FIG. 12 is a horizontal sectional view, wherein the optical connector plug shown in FIG. 5 and the optical connector plug applied with the partial design change are connected in the plug-adapter-plug fashion and wherein only one of the optical connector plugs is fitted to an adapter;

DESCRIPTION OF THE PREFERRED EMBODIMENTS

With reference to FIGS. 5 to 15, description will be made as regards an optical connector plug 1 as an optical fiber connector according to a first embodiment of the present invention.

Figure 1A:
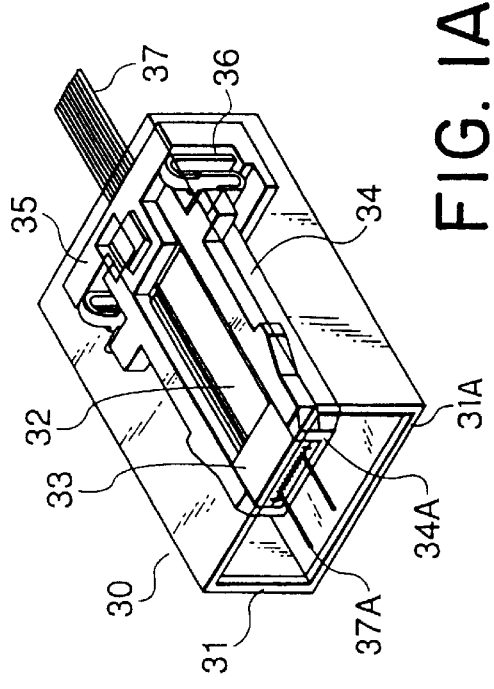
Figure 1C:
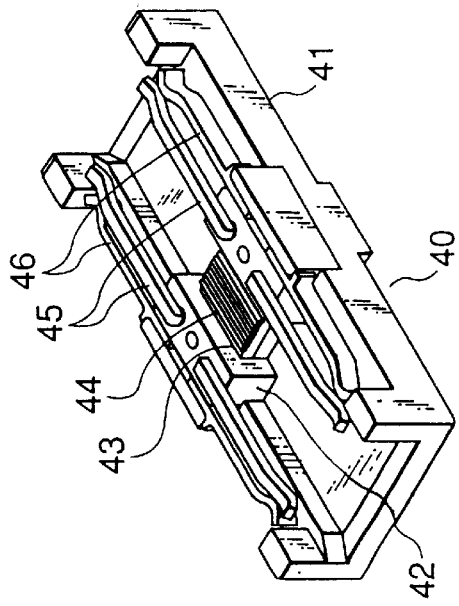
Figure 1B:
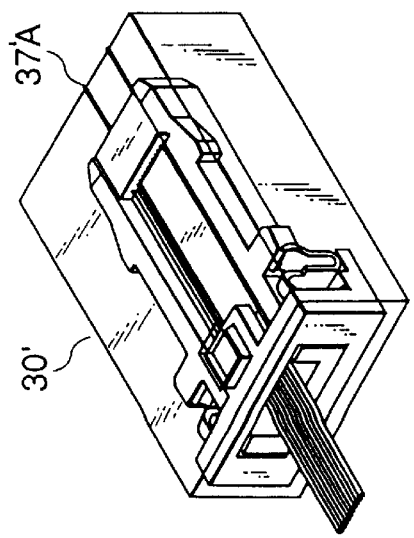
Figure 2:
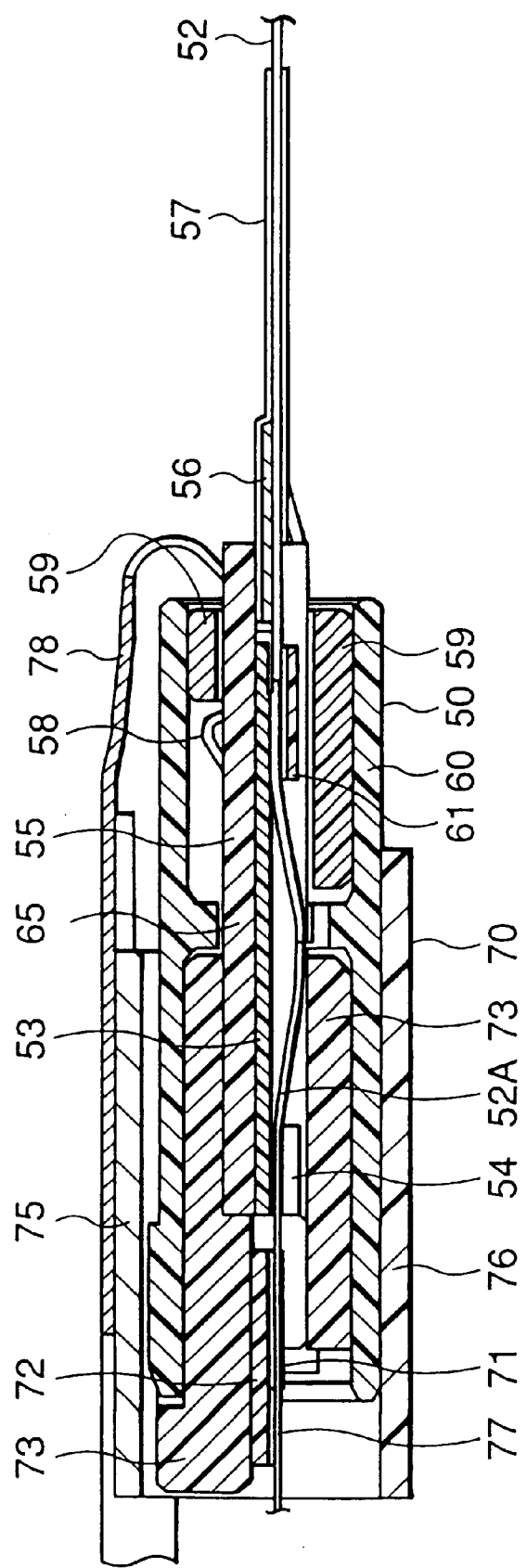
FIG. 2 is a vertical sectional view of a second conventional optical fiber connector.
Figure 3:
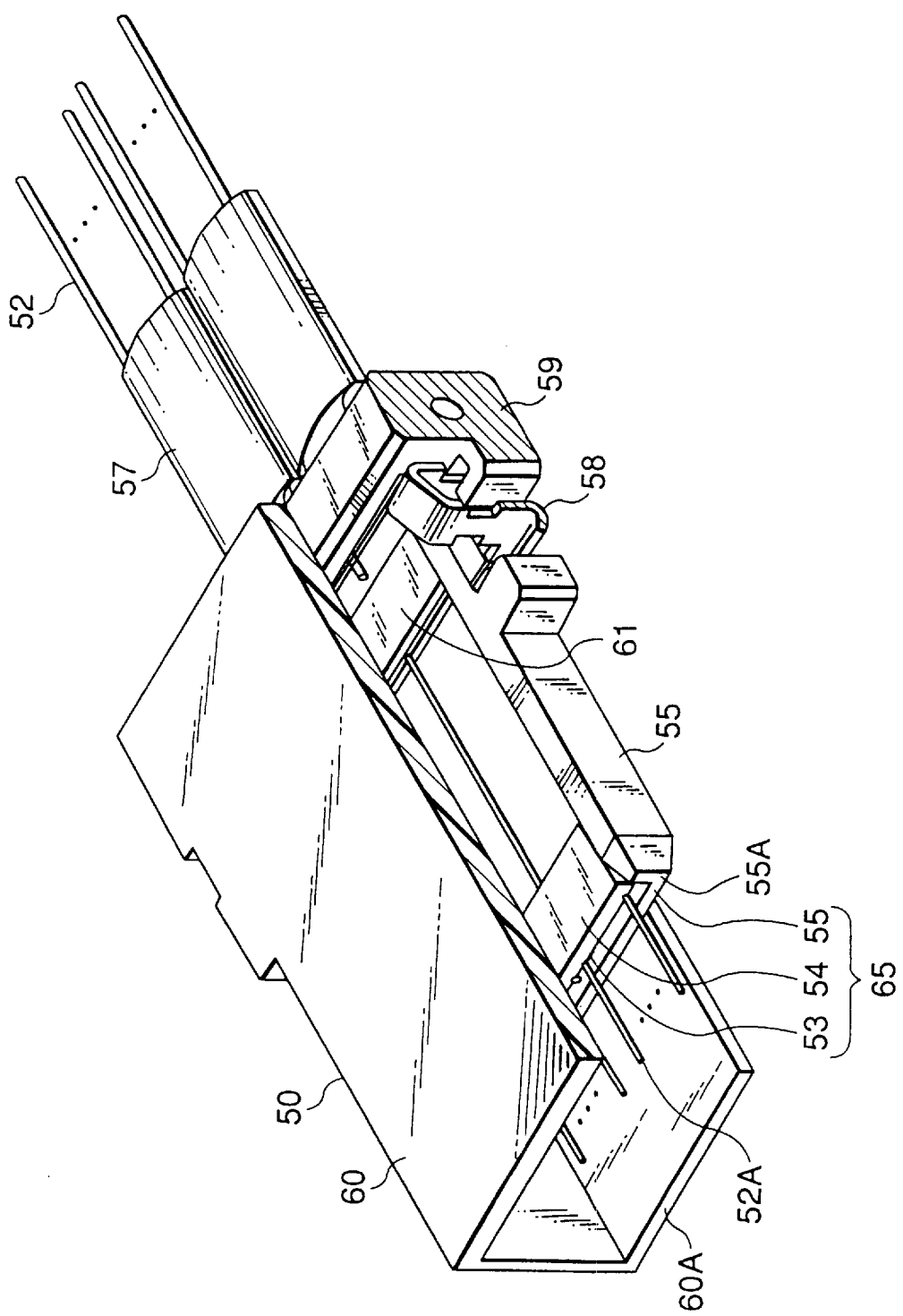
FIG. 3 is a partly-sectioned perspective view of an optical connector plug of the optical fiber connector shown in FIG. 2.
Figure 4:
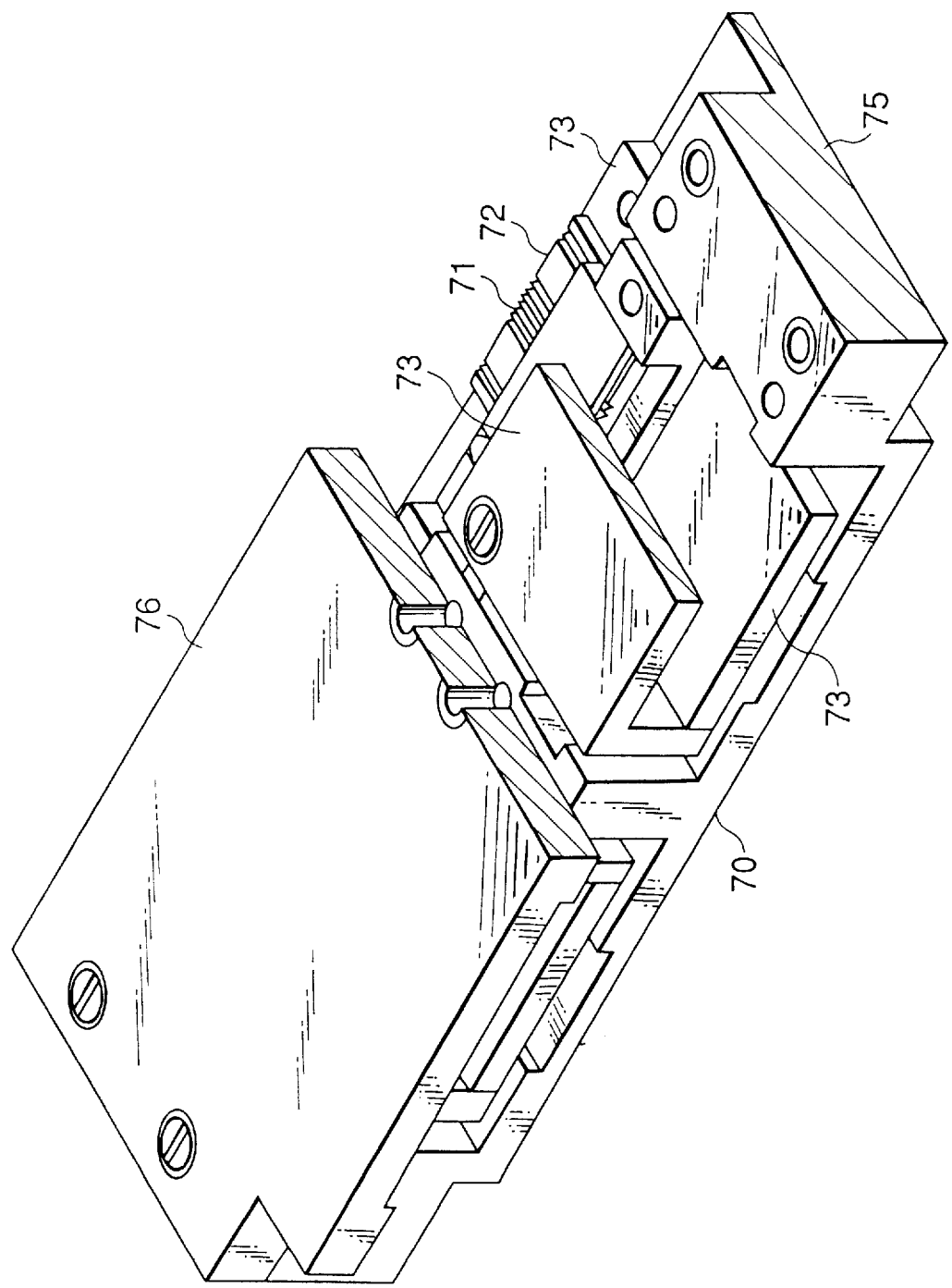
FIG. 4 is a partly-sectioned perspective view of a receptacle of the optical fiber connector shown in FIG. 2.
Figure 5:
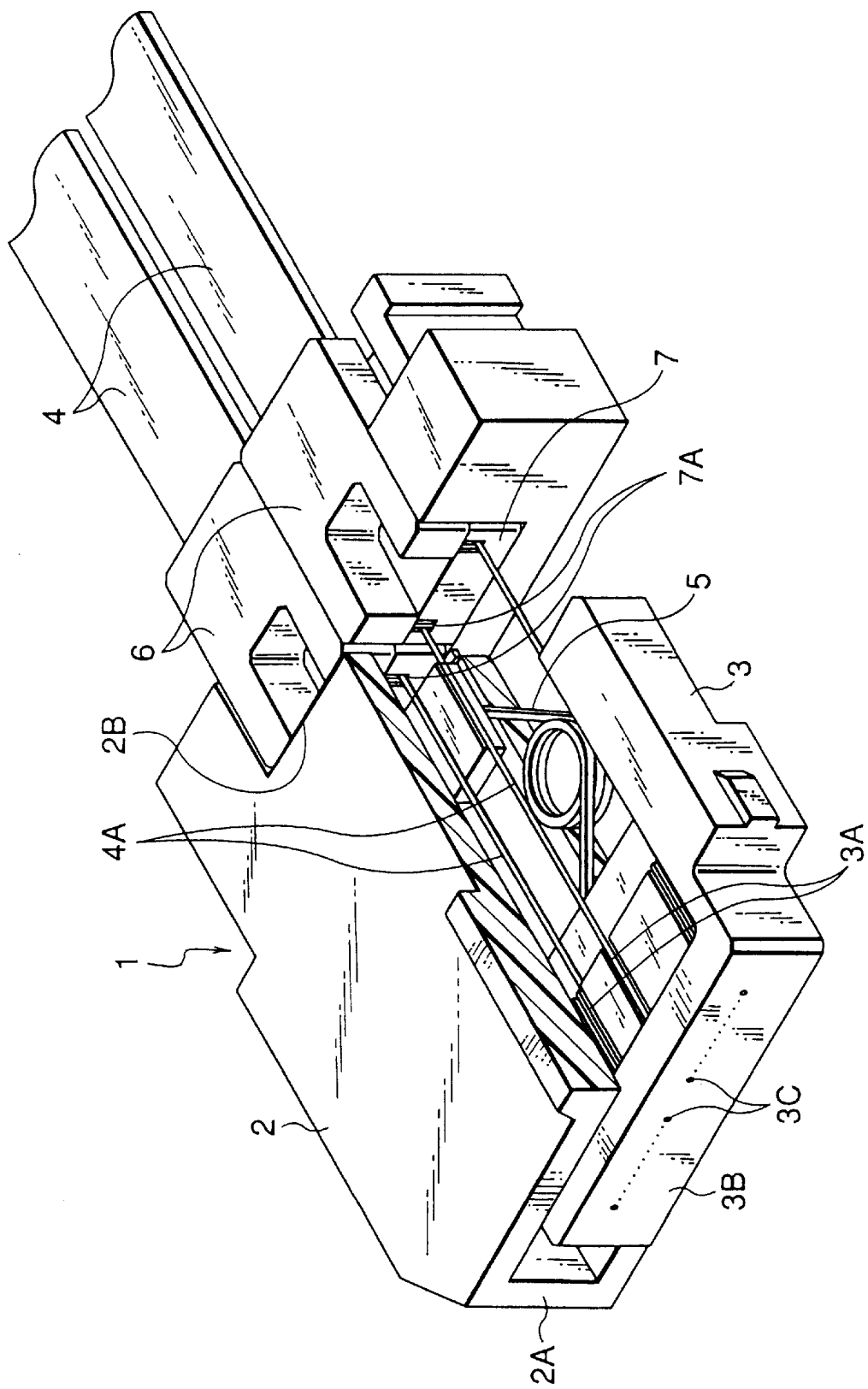
FIG. 5 is a partly-sectioned perspective view of an optical connector plug as an optical fiber connector according to a first embodiment of the present invention, wherein an end surface of an aligning member is projected from an end surface of an outer member.

In FIG. 5, an end surface 3B of an aligning member 3 is projected from an end surface 2A of an outer member 2. In the outer member 2, the aligning member 3 is slidably disposed. The aligning member 3 is formed near the end surface 3B thereof with a number of parallel slots 3A for receiving therein a number of optical fibers 4A (only some of which are shown). The aligning member 3 is further formed with a number of small holes 3C which parallelly extend inward from the end surface 3B. Each of the small holes 3C has an inner diameter (0.14 mm) which is slightly greater than an outer diameter (0.125 mm) of each of the optical fibers 4A. The aligning member 3 is urged by a torsion coil spring 5 in a direction to project from the end surface 2A of the outer member 2. Two pairs of first and second clamp members 6 and 7 are mounted in a concave portion 2B of the outer member 2. The optical fibers 4A forming a pair of tape fibers 4 are bonded to the corresponding first clamp members 6 and can be projected from the corresponding small holes 3C via a number of parallel slots 7A formed on the second clamp members 7, the inside space of the outer member 2 and the slots 3A of the aligning member 3. The second clamp members 7 are bonded to the corresponding first clamp members 6 for protecting those portions where the optical fibers 4A are bonded to the first clamp members 6. On the other hand, the second clamp members 7 may be formed integral with the outer member 2.

Figure 6:
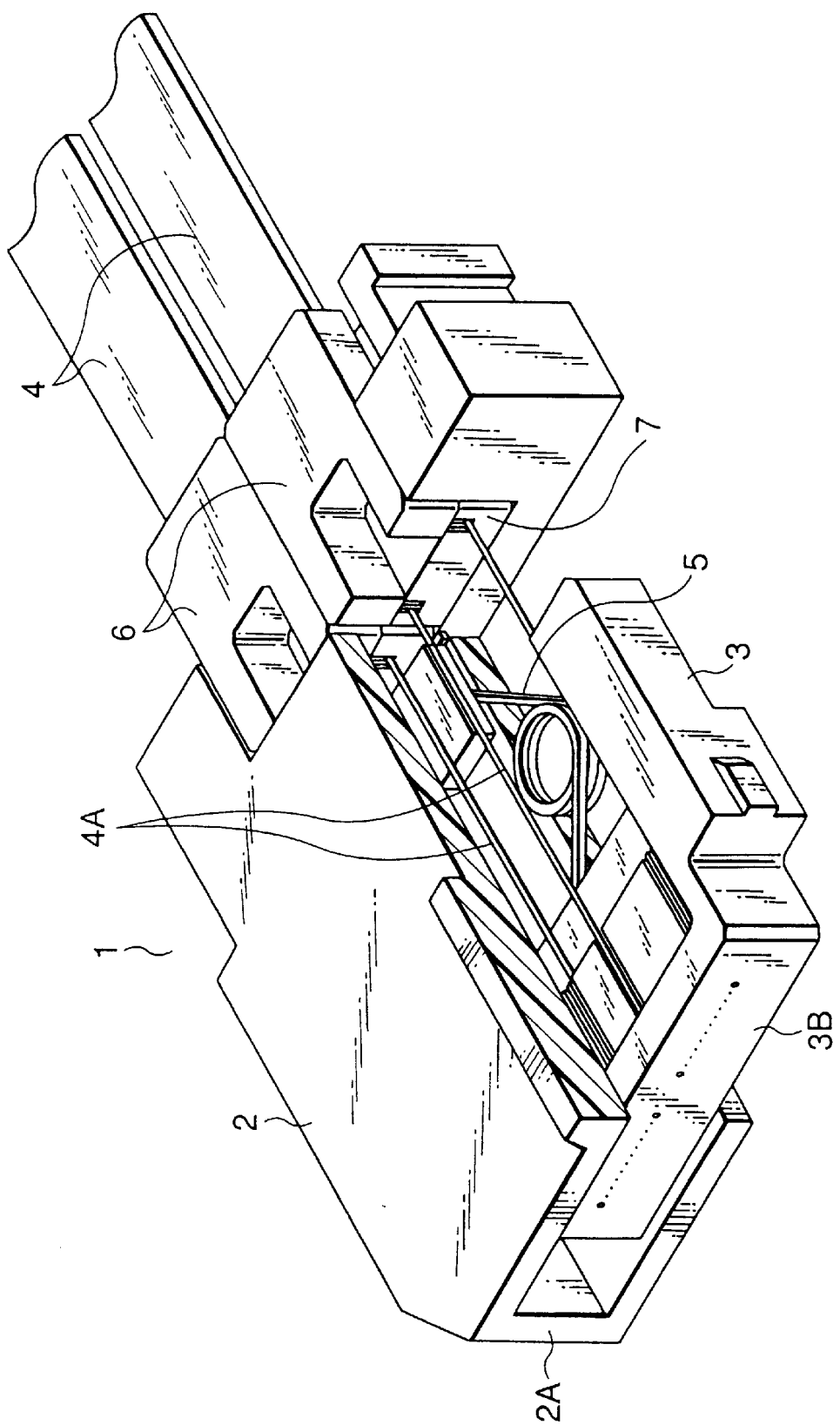
FIG. 6 is a partly-sectioned perspective view of the optical connector plug shown in FIG. 5, wherein the end surface of the aligning member is retreated from the end surface of the outer member.

In FIG. 6, the end surface 3B of the aligning member 3 is retreated from the end surface 2A of the outer member 2. Since each of the optical fibers 4A is located inward of the end surface 3B of the aligning member 3 (see FIG. 14), a fitting-side end portion of the optical connector plug 1 is protected. However, since a fitting-side end of each optical fiber 4A is located inward of the outer member 2, connection of a plug-adapter-plug type (see FIGS. 8A, 8B) can not be achieved using two optical connector plugs 1. On the other hand, connection of a plug-receptacle type (see FIG. 9) can be achieved using one optical connector plug 1 and one receptacle.

Figure 7A:
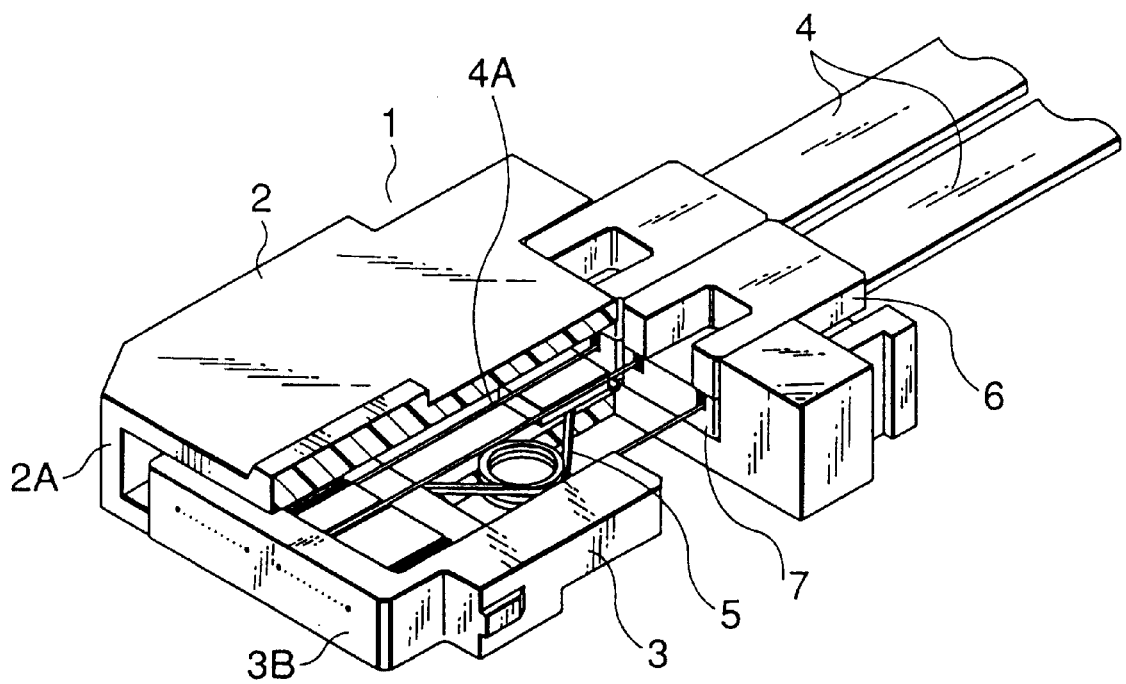

In FIG. 7A, the end surface 3B of the aligning member 3 is projected from the end surface 2A of the outer member 2. Specifically, FIG. 7A shows the state of the optical connector plug 1 before the end surface 3B of the aligning member 3 is pushed into the outer member 2 by a member of an adapter (not shown), i.e. the state before fitting to the adapter (initial state).

Figure 7B:
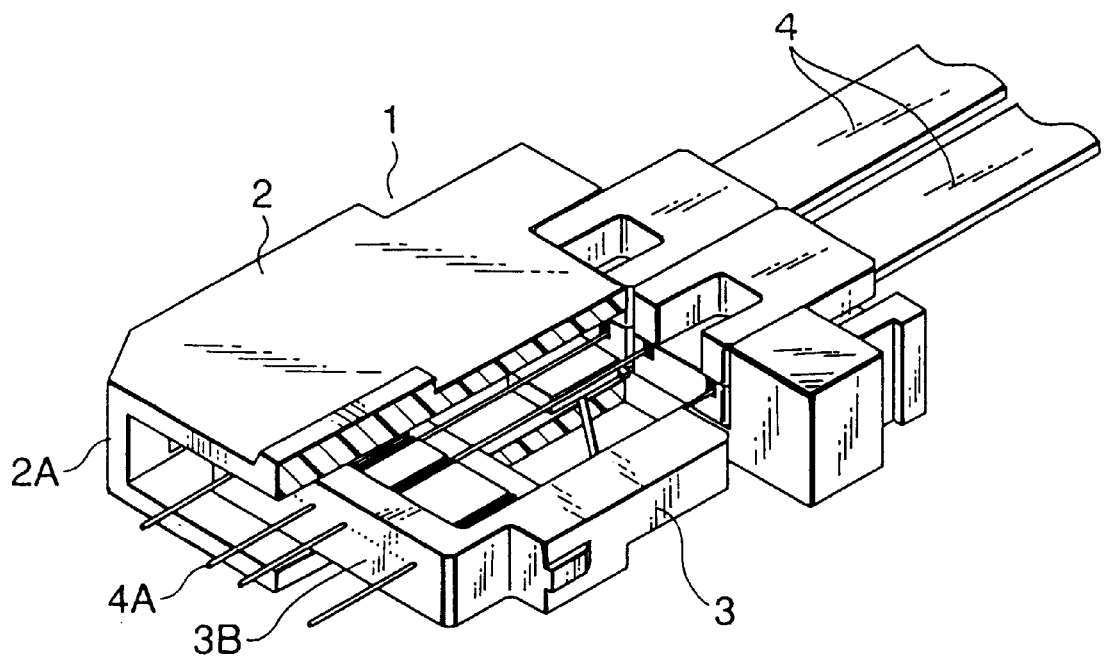

In FIG. 7B, the end surface 3B of the aligning member 3 is retreated from the end surface 2A of the outer member 2. Specifically, FIG. 7B shows the state of the optical connector plug 1 wherein the end surface 3B of the aligning member 3 is pushed into the outer member 2 by the member of the adapter, i.e. the state after fitting to the adapter, and the optical fibers 4A are projected from the end surface 3B.

In FIGS. 8A and 8B, the optical connector plug 1' has the same structure as the optical connector plug 1. Portions of the optical connector plug 1' correspond to those of the optical connector plug 1 are assigned the same reference signs with dash (').

In FIG. 8A showing the state before fitting to an adapter 11, the adapter 11 comprises a pair of outer members 12 each in the form of a rectangular tube with a pair of flanges, a V-groove base plate retaining member 13 disposed in the outer members 12 at an adjoined portion thereof, a V-groove base plate 14 disposed on the V-groove base plate retaining member 13, and a number of micro-sleeves 15 parallelly arranged on the V-groove base plate 14. The outer members 12 are fixed together by inserting bolts into holes 12C formed through the respective flanges thereof. The V-groove base plate retaining member 13, the V-groove base plate 14 and the micro-sleeves 15 may be formed integral with each other of a resin material.

In FIG. 8B showing the state after fitting to the adapter 11. For fitting to the adapter 11, the optical connector plugs 1 and 1' are first inserted into rectangular tubular portions 12A of the corresponding outer members 12. Then, bent engaging portions 16A of each of lock springs 16, formed at both sides of the lock spring 16 at one end thereof, are engaged with engaging concave portions 12B of the corresponding outer member 12 formed at both sides of the outer member 12 at one end thereof, and curved plate spring portions 16B of each lock spring 16, formed at both sides of the lock spring 16 at the other end thereof, are engaged with end surface engaging portions 2C or 2' C of the corresponding optical connector plug 1 or 1' formed at both sides of the optical connector plug 1 or 1' at the other end thereof.

Figure 9:
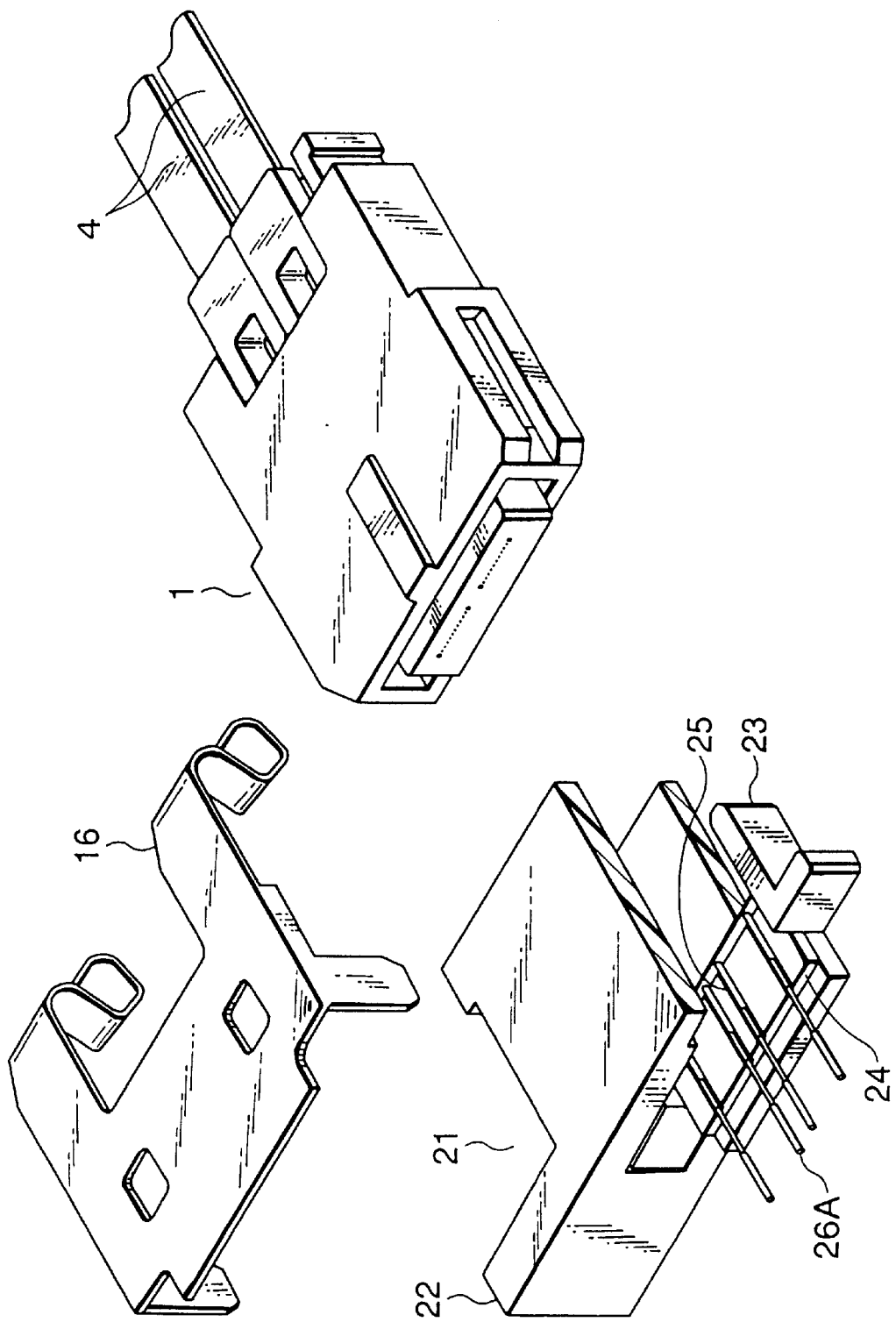
FIG. 9 is a partly-sectioned perspective view, wherein the optical connector plug shown in FIG. 5 is connected in a plug-receptacle fashion and wherein the state before fitting is shown.

In FIG. 9, a receptacle 21 comprises an outer member 22 in the form of a flanged rectangular tube, a V-groove base plate retaining member 23 disposed in the outer member 22, a V-groove base plate 24 disposed on the V-groove base plate retaining member 23, and a number of micro-sleeves 25 parallelly arranged on the V-groove base plate 24.

Optical fibers 26A are bonded to the corresponding micro-sleeves 25. Each of the micro-sleeves 25 has an outer diameter of 0.25 mm and an inner diameter of 0.126 mm, while each of the optical fibers 26A has an outer diameter of 0.125 mm. Positioning between each of the optical fibers 26A and the corresponding micro-sleeve 25 is carried out so that each optical fiber 26A is connected to the corresponding micro-sleeve 25. The micro-sleeves 25, the V-groove base plate 24 and the V-groove base plate retaining member 23 may be formed integral with each other of a resin material.

Figure 10:
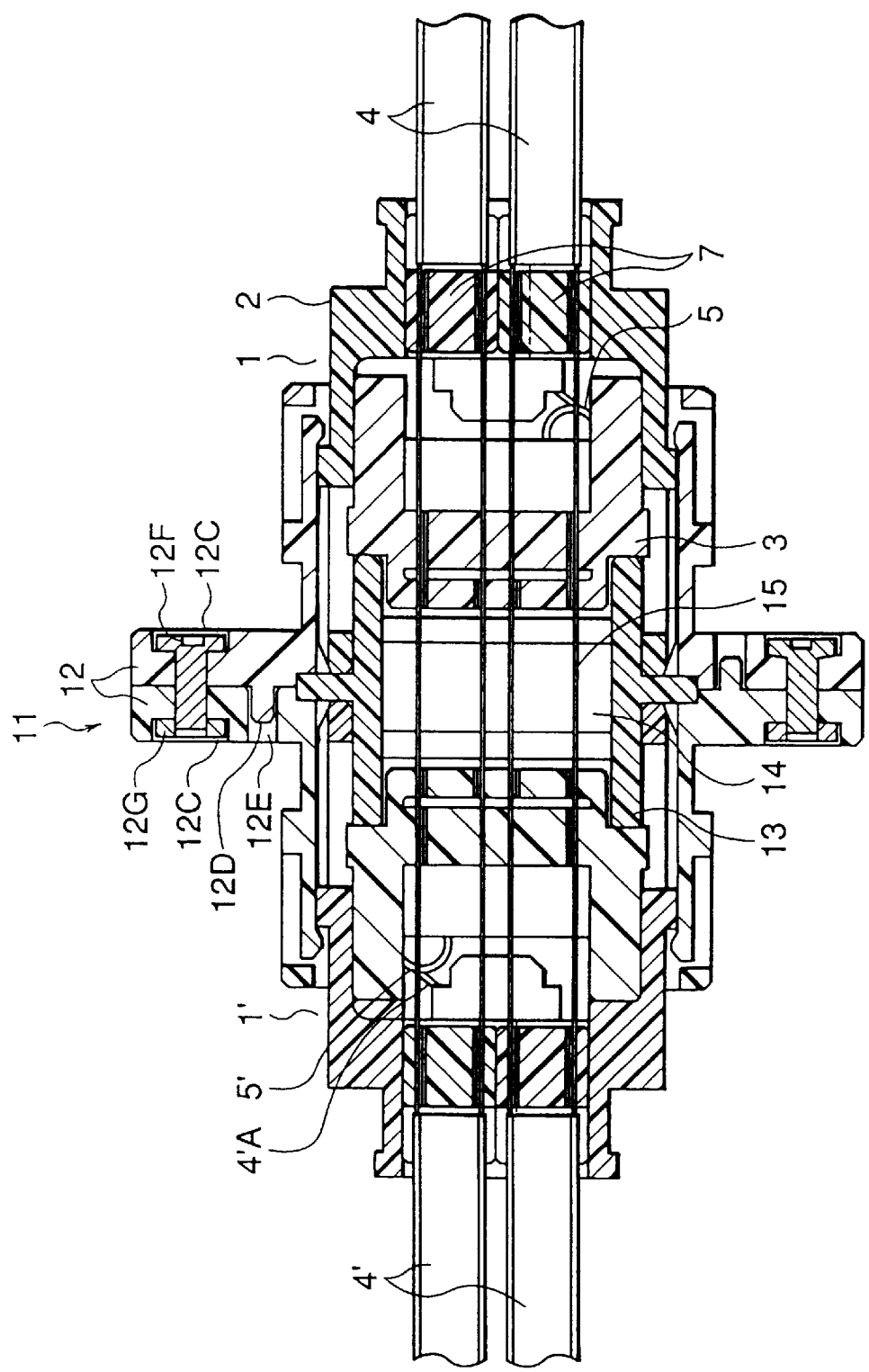
FIG. 10 is a horizontal sectional view of FIG. 8B.

In FIG. 10, an end surface of each of the optical fibers 4A of the optical connector plug 1 and an end surface of each of optical fibers 4'A of the optical connector plug 1' are so positioned as to confront each other in the corresponding micro-sleeve 15 of the adapter 11. One of the flanges of each of the outer members 12 is formed with a positioning projection 12D, while the other is formed with a hole 12E. The positioning projection 12D of each of the outer members 12 is first inserted into the hole 12E of the confronting outer member 12, then both outer members 12 are firmly fixed together by means of bolts 12F and nuts 12G at the holes 12C of the flanges of the outer members 12.

Figure 11:
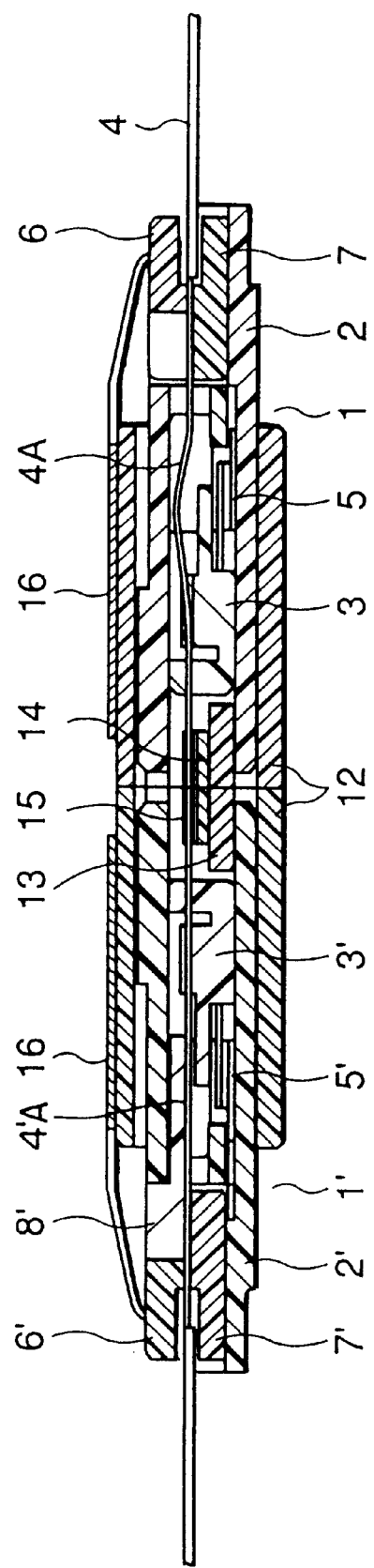
FIG. 11 is a vertical sectional view, wherein the optical connector plug shown in FIG. 5 and an optical connector plug applied with a partial design change are connected in the plug-adapter-plug fashion and wherein the state after fitting is shown.

In FIG. 11, the optical connector plug 1' differs in structure from the optical connector plug 1 only in the following points: Specifically, the optical connector plug 1' is provided with a third clamp member 8' adjacent to a first clamp member 6', and optical fibers 4'A are bonded to the third clamp member 8'. Further, a length of each optical fiber 4'A of the optical connector plug 1' is set to be slightly shorter than that of each optical fiber 4A of the optical connector plug 1.

Therefore, only each optical fiber 4A of the optical connector plug 1 is subjected to bending as shown in FIG. 11. Accordingly, an end surface of each optical fiber 4A and an end surface of each optical fiber 4'A abut each other with an adequate pressing force, so that the optical performance is stabilized. A length of a bent portion of each optical fiber 4A is about 10 mm so that the pressing force is suppressed to an extent where an adequate buckling load is applied to each optical fiber 4'A.

In FIG. 12, the optical connector plug 1' is fitted to the adapter 11 while the optical connector plug 1 is not yet fitted to the adapter 11. An aligning member 3' of the optical connector plug 1' is pressed by the V-groove base plate retaining member 13 of the adapter 11 so as to be pushed into an outer member 2' against a torsion force of a torsion coil spring 5'. Accordingly, one end of each optical fiber 4'A is projected from an end surface 3'B of the aligning member 3' and thus can be inserted into the corresponding micro-sleeve 15 of the adapter 11. Since the aligning member 3 of the optical connector plug 1 is not yet pressed by the V-groove base plate retaining member 13 of the adapter 11, one end of each optical fiber 4A is not projected from the end surface 3B of the aligning member 3.

Figure 13:
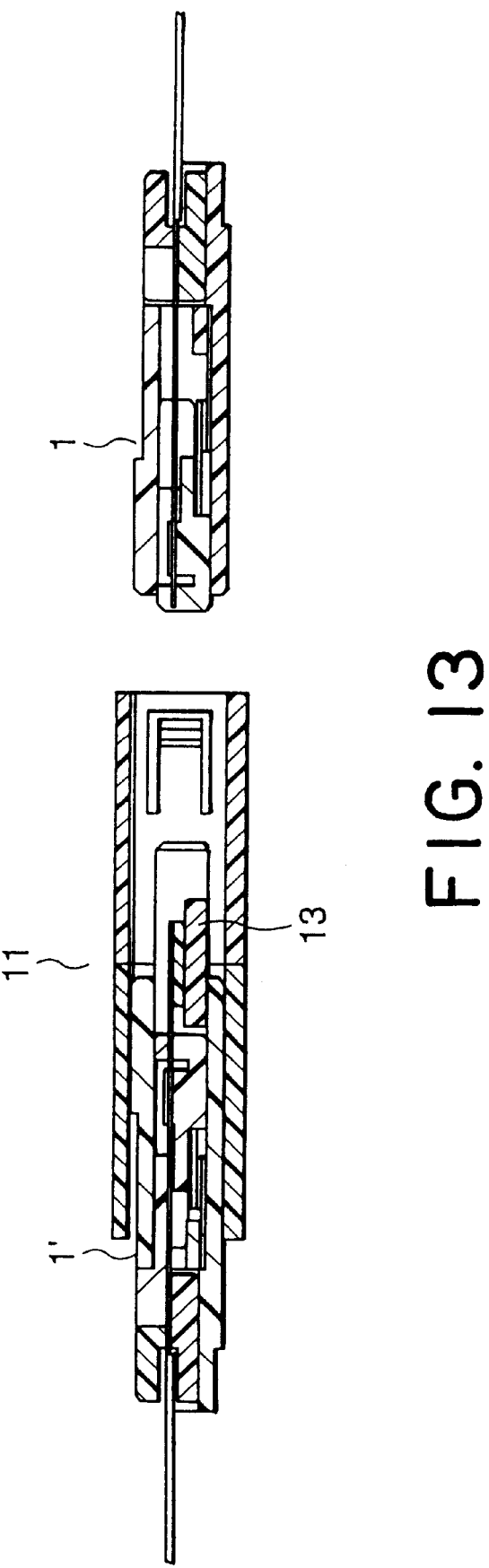
FIG. 13 is a vertical sectional view, wherein the optical connector plug shown in FIG. 5 and the optical connector plug applied with the partial design change are connected in the plug-adapter-plug fashion and wherein only one of the optical connector plugs is fitted to the adapter.

In FIG. 13, the optical connector plug 1' is fitted to the adapter 11 while the optical connector plug 1 is not yet fitted to the adapter 11.

Figure 14:
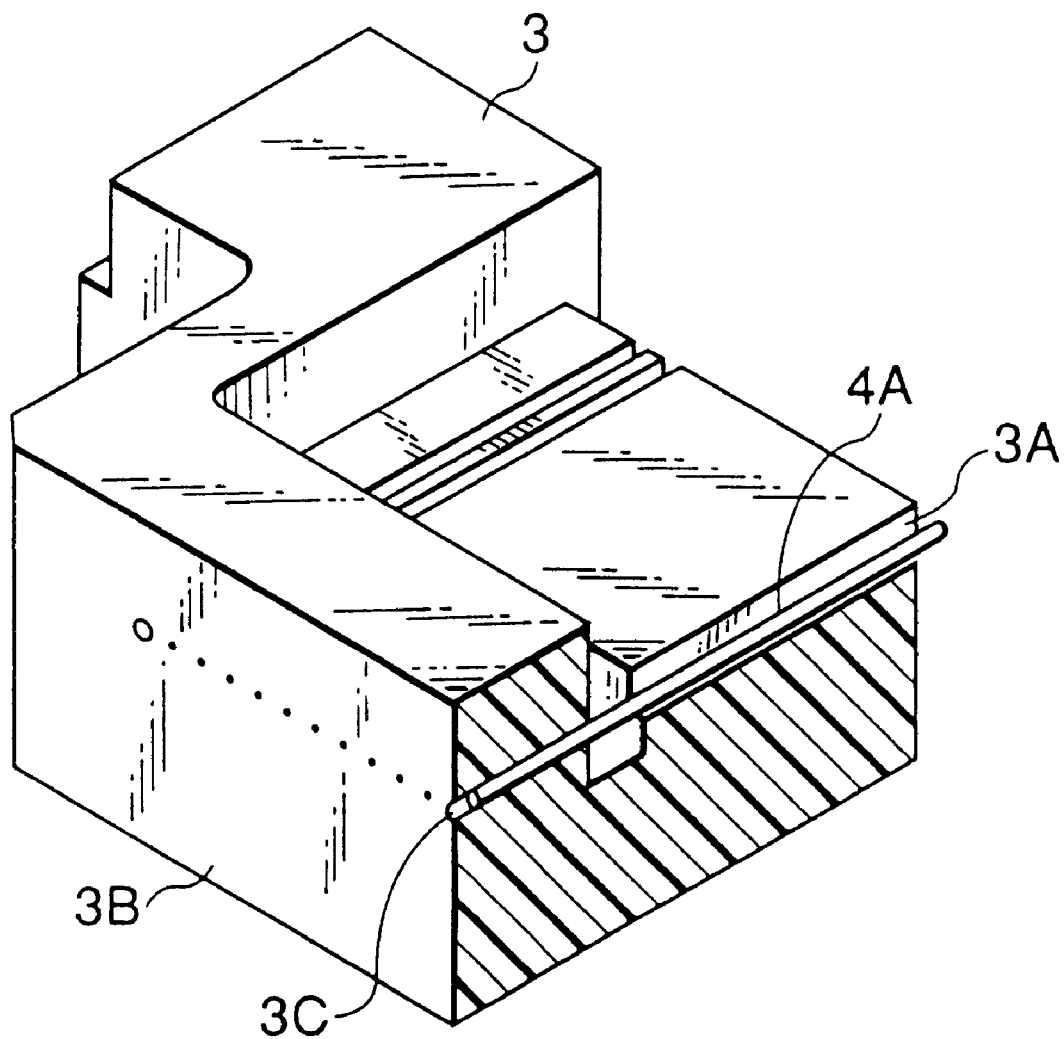
FIG. 14 is a partly-sectioned perspective view showing a positional relationship between the aligning member and each of optical fibers in the optical connector plug shown in FIG. 5.

In FIG. 14, since a width of each slot 3A is set to be slightly greater than the outer diameter of each optical fiber 4A, each optical fiber 4A is slidably received in the corresponding slot 3A. On the other hand, since a depth of each slot 3A is set to be several times the outer diameter of each optical fiber 4A, a bending direction of each optical fiber 4A is limited to a depth direction of the slot 3A.

Figure 15:
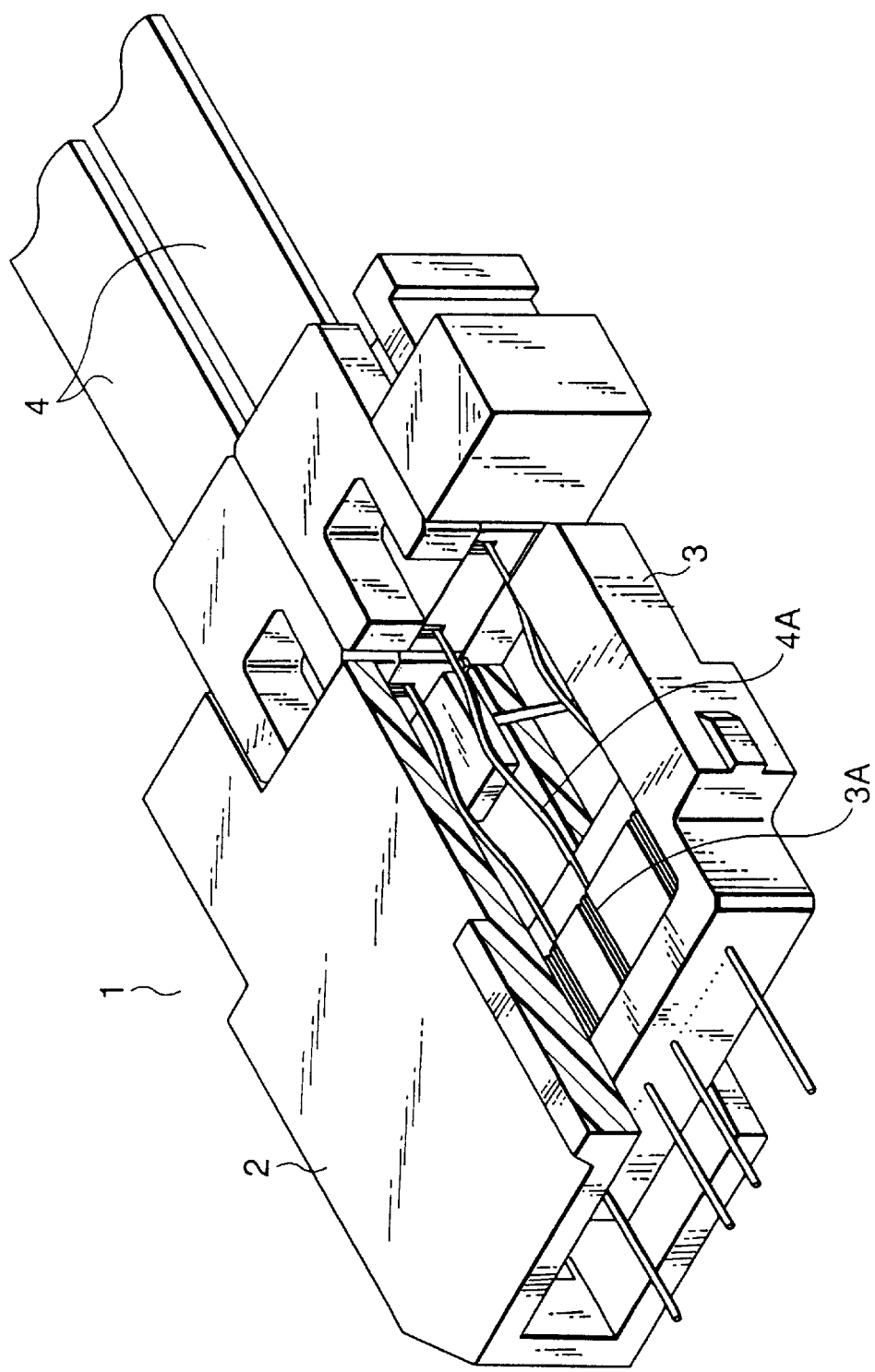
FIG. 15 is a partly-sectioned perspective view showing a bending state of each of the optical fibers in the optical connector plug shown in FIG. 5.

In FIG. 15, since the parallel slots 3A are provided on the aligning member 3 of the optical connector plug 1, the optical fibers 4A received in the corresponding slots 3A can be bent in one direction, i.e. upward.

In the foregoing description, the end surface 3B of the aligning member 3 is projected beyond the end surface 2A of the outer member 2 before the fitting. However, it may be arranged that the end surface 3B of the aligning member 3 is located on the same plane as the end surface 2A of the outer member 2. Further, a material of the torsion coil springs 5 and 5' is not limited to metal, but may be synthetic resin or the like. Moreover, the torsion coil springs 5 and 5' may be replaced with expansion coil springs, plate springs or the like.

The foregoing optical connector plug 1 can achieve the following effects:

1. A fitting-side end of each optical fiber is not projected from the aligning member and is thus protected therewithin when the optical connector plug is not fitted to the adapter or receptacle. Thus, handling of the optical connector plug is facilitated.

2. The aligning member is slidable upon fitting so that positioning between the optical connector plug and the adapter or receptacle is easy. Accordingly, it is applicable to a narrow-pitch or multi-fiber optical fiber connector.

3. Since the positioning accuracy required for the narrow-pitch or multi-fiber optical fiber connector is relaxed, the cost can be reduced.

4. Since the optical connector plug is applicable to not only the plug-receptacle type connection, but also the plug-adapter-plug type connection, it can contribute to realization of a general purpose optical fiber connector.

With reference to FIGS. 16 to 19, the description will be made as regards an optical fiber connector according to a second embodiment of the present invention. Similar parts are designated by like reference numerals.

Figure 16:
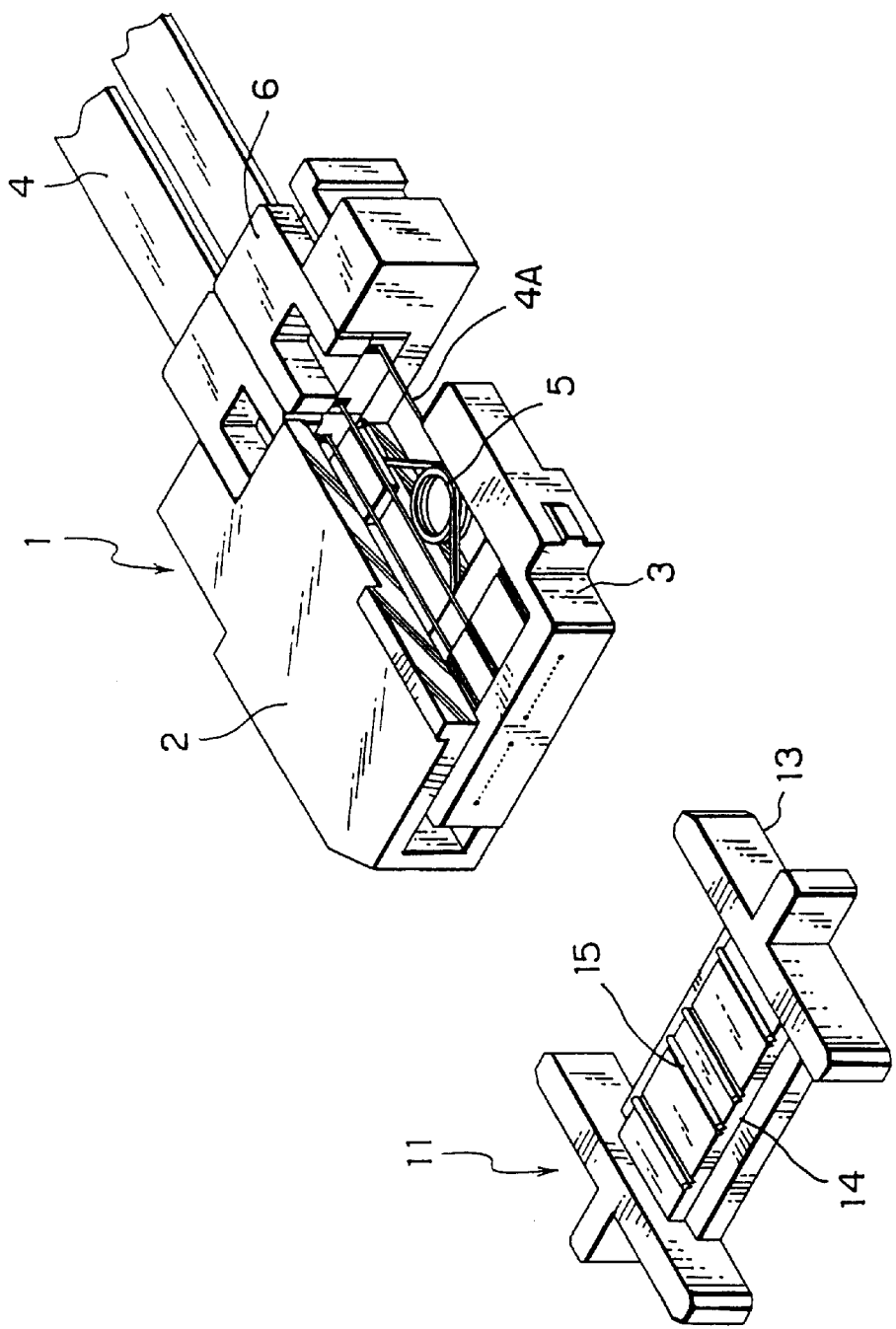
FIG. 16 is a partly-sectioned perspective view showing an optical fiber connector according to a second embodiment of the present invention.
Figure 20:
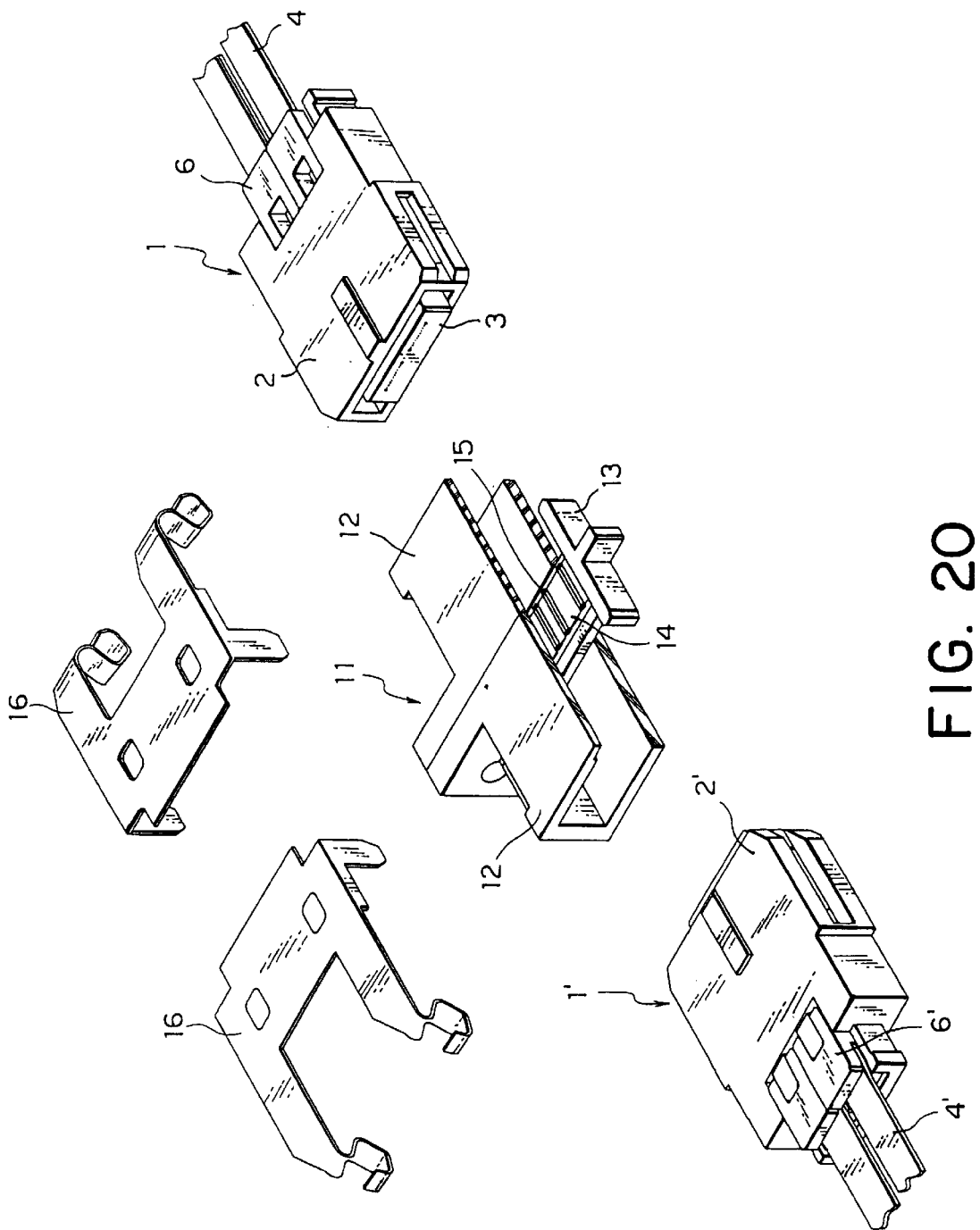
FIG. 20 is a partly-sectioned perspective view showing an optical fiber connector according to a third embodiment of the present invention.

As shown in FIG. 16, the optical fiber connector basically comprises an optical connector plug 1 and an adapter 11 for connecting the optical connector plug 1 to another optical connector plug such as an optical connector plug 1' shown in FIG. 20.

The optical connector plug 1 (or the optical connector plug 1') comprises a pair of tape fibers 4 each obtained by forming a number of parallel optical fibers 4A together into a flat plate shape using synthetic resin or the like, a pair of clamp members 6 clamping the optical fibers 4A which are exposed by removing coating of the tape fibers 4 at end portions thereof, an aligning member 3 holding tip portions of the optical fibers 4A in an aligned state, an outer member 2 holding the clamp members 6, the aligning member 3 and so forth, and an elastic member 5 elastically pressing the aligning member 3 in a direction (lower-left direction in FIG. 16) to project from the end surface of the outer member 2. The aligning member 3 is slidable inside the outer member 2 along the optical fibers 4A.

The adapter 11 includes a V-groove base plate retaining member 13. On the V-groove base plate retaining member 13, there are mounted a V-groove base plate 14 formed thereon with a number of parallel V-grooves, and a number of micro-sleeves 15 as an aligning member which are retained in the corresponding V-grooves and allow the corresponding optical fibers 4A to pass therethrough. In this fashion, the tip portions of the optical fibers 4A are slidably held.

Figure 17:
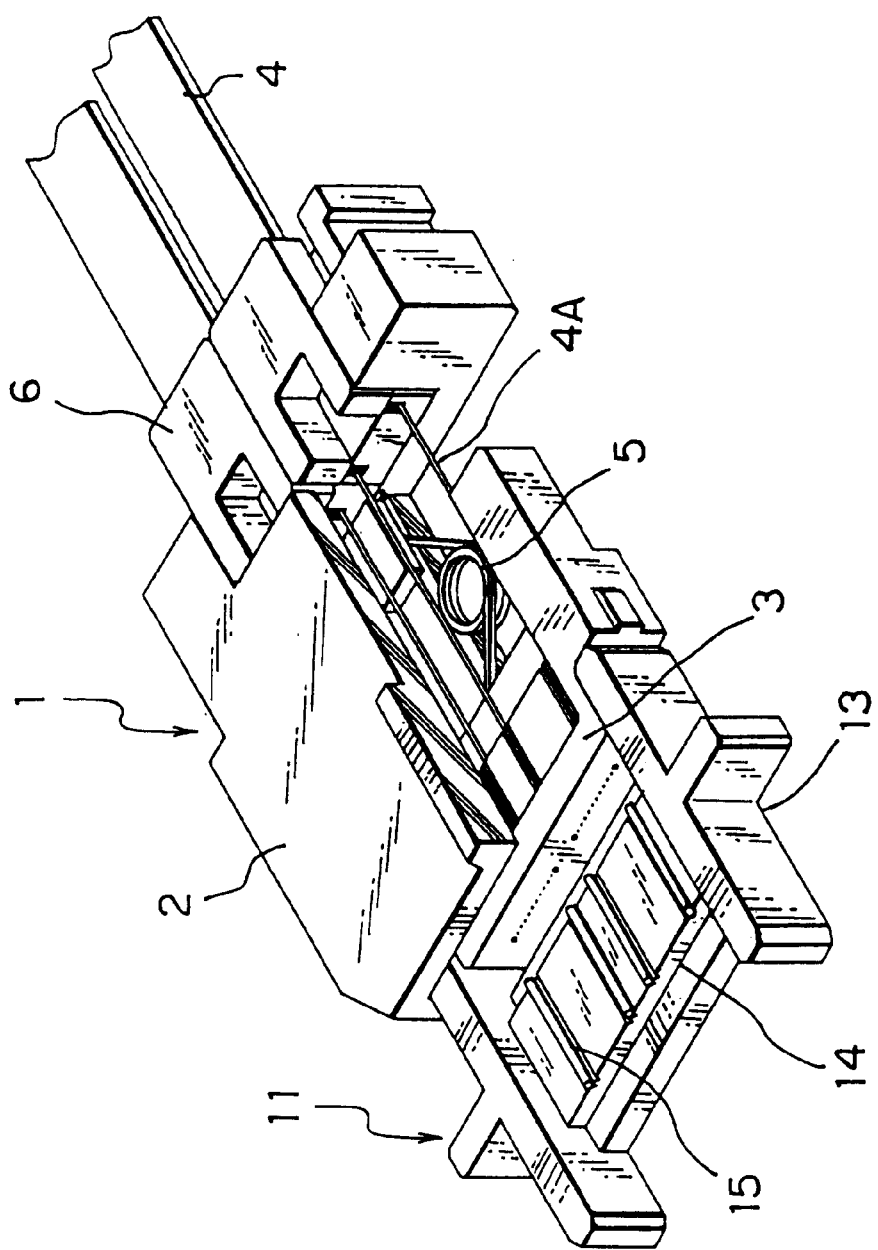
FIG. 17 is a partly-sectioned perspective view showing the state of connecting an optical connector plug and an adapter shown in FIG. 16.
Figure 18:
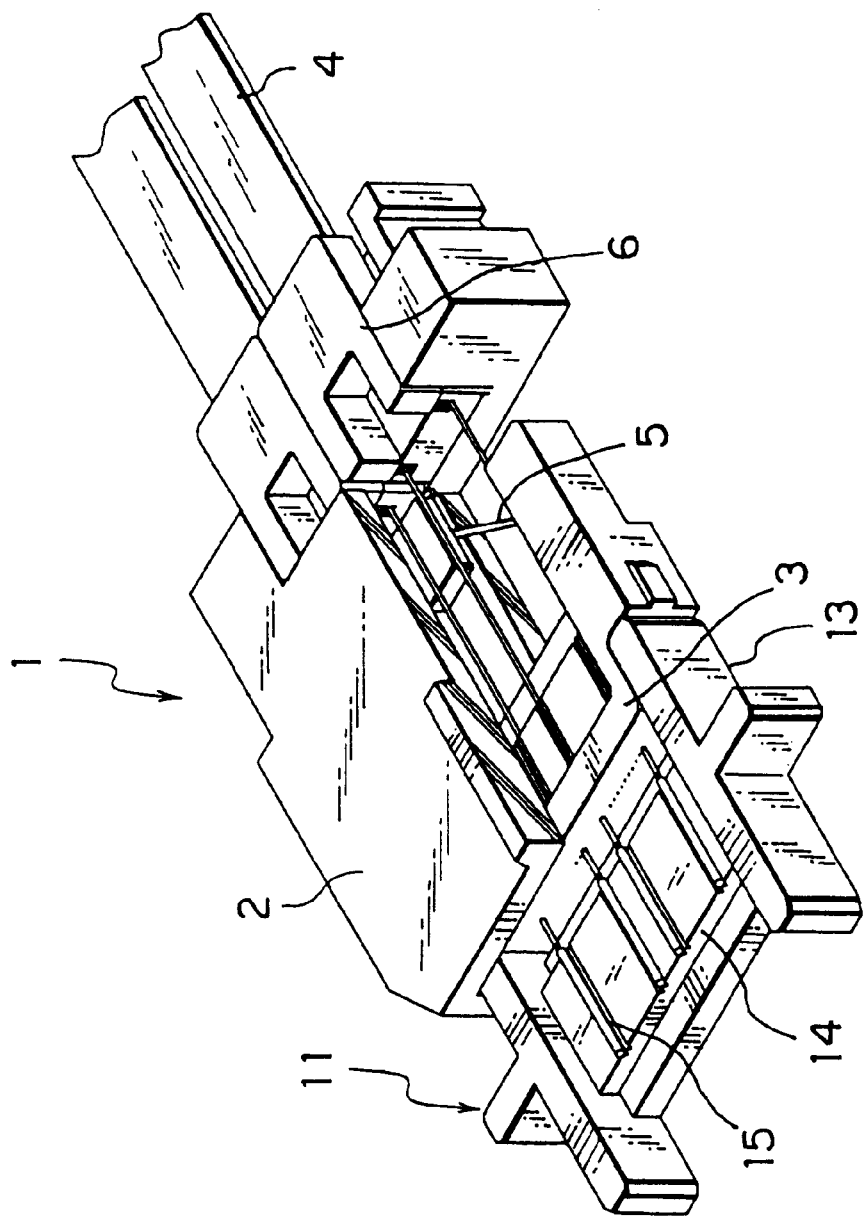
FIG. 18 is a partly-sectioned perspective view showing the state of connecting the optical connector plug and the adapter shown in FIG. 16.
Figure 19:
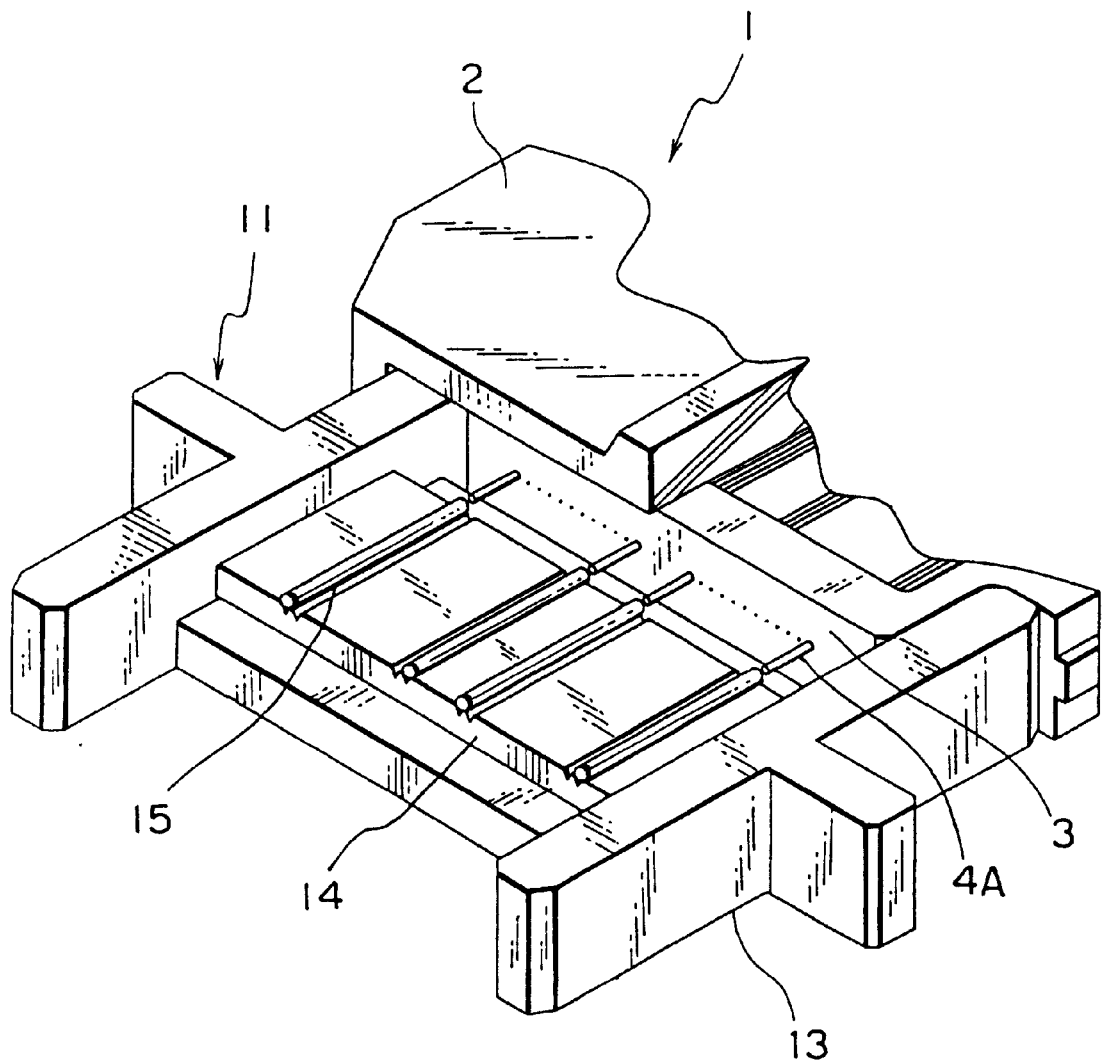
FIG. 19 is an enlarged view of the main part shown in FIG. 18.

In this optical fiber connector, when connecting the optical fibers 4a to the adapter 11, the adapter 11 is inserted along the inner periphery of the outer member 2 to a predetermined position as shown in FIG. 17. Then, the end surface of the aligning member 3 is caused to abut an end surface of the V-groove base plate retaining member 13. Subsequently, as shown in FIGS. 16 to 19, the aligning member 3 is further pushed by the adapter 11 so as to slide in a direction opposite to the direction in which the aligning member 3 is pressed by the elastic member 5, so that the tip portions of the optical fibers 4A are projected from the aligning member 3. Then, by further pushing the aligning member 3 in the same direction, the tip portions of the optical fibers 4A are inserted into the micro-sleeves 15 of the adapter 11.

The position of the optical fibers 4A in the optical connector plug 1 is set based on the inner periphery of the outer member 2. Further, the position of the micro-sleeves 15 relative to the optical connector plug 1 is set based on the outer periphery of the V-groove base plate retaining member 13. Then, positioning between the aligning member 3 and the V-groove base plate retaining member 13 is carried out using the inner periphery of the outer member 2 as an aligning guide or a positioning guide.

According to the optical fiber connector in this embodiment, the positioning between the optical fibers and the adapter can be achieved stably. Since the positioning between the optical fibers in the optical connector plug and the aligning member in the adapter can be stably carried out, it is applicable to the narrow-pitch multi-fiber connector. Further, by using the inner periphery of the outer member of the optical connector plug as an aligning or positioning guide, the optical connector plug can be reduced in size.

With reference to FIGS. 20 to 25, the description will be made as regards an optical fiber connector according to a third embodiment of the present invention. Similar parts are designated by like reference numerals.

Figure 21:
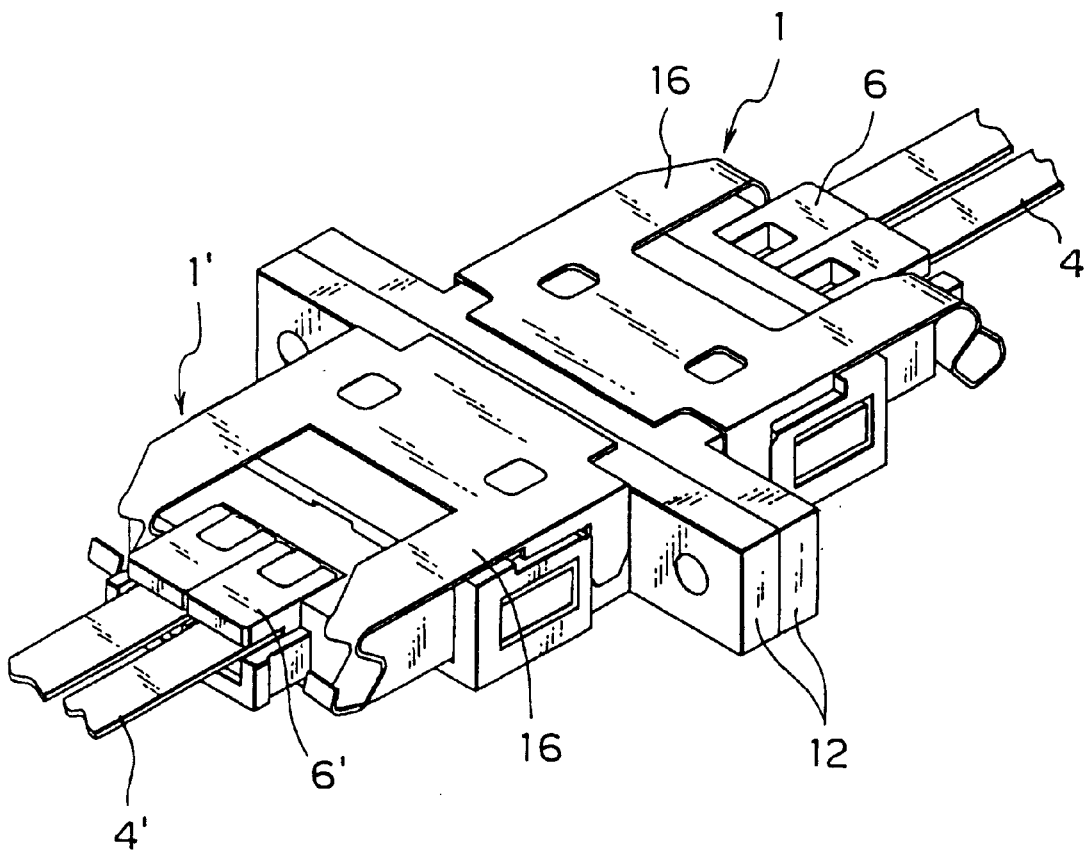
FIG. 21 is a perspective view showing the connected state of the optical fiber connector shown in FIG. 20.

In the optical fiber connector, an optical connector plug 1 and an optical connector plug 1' are connected via an adapter 11. Specifically, as shown in FIGS. 20 and 21, the optical fiber connector comprises the optical connector plug 1, the optical connector plug 1', the adapter 11 and two lock springs 16 for connecting the optical connector plugs 1 and 1' to the adapter 11, respectively. As in the foregoing embodiments, the adapter 11 includes a V-groove base plate retaining member 13 mounted thereon with a V-groove base plate 14 and micro-sleeves 15, and a pair of outer members 12 holding the V-groove base plate retaining member 13.

Figure 22:
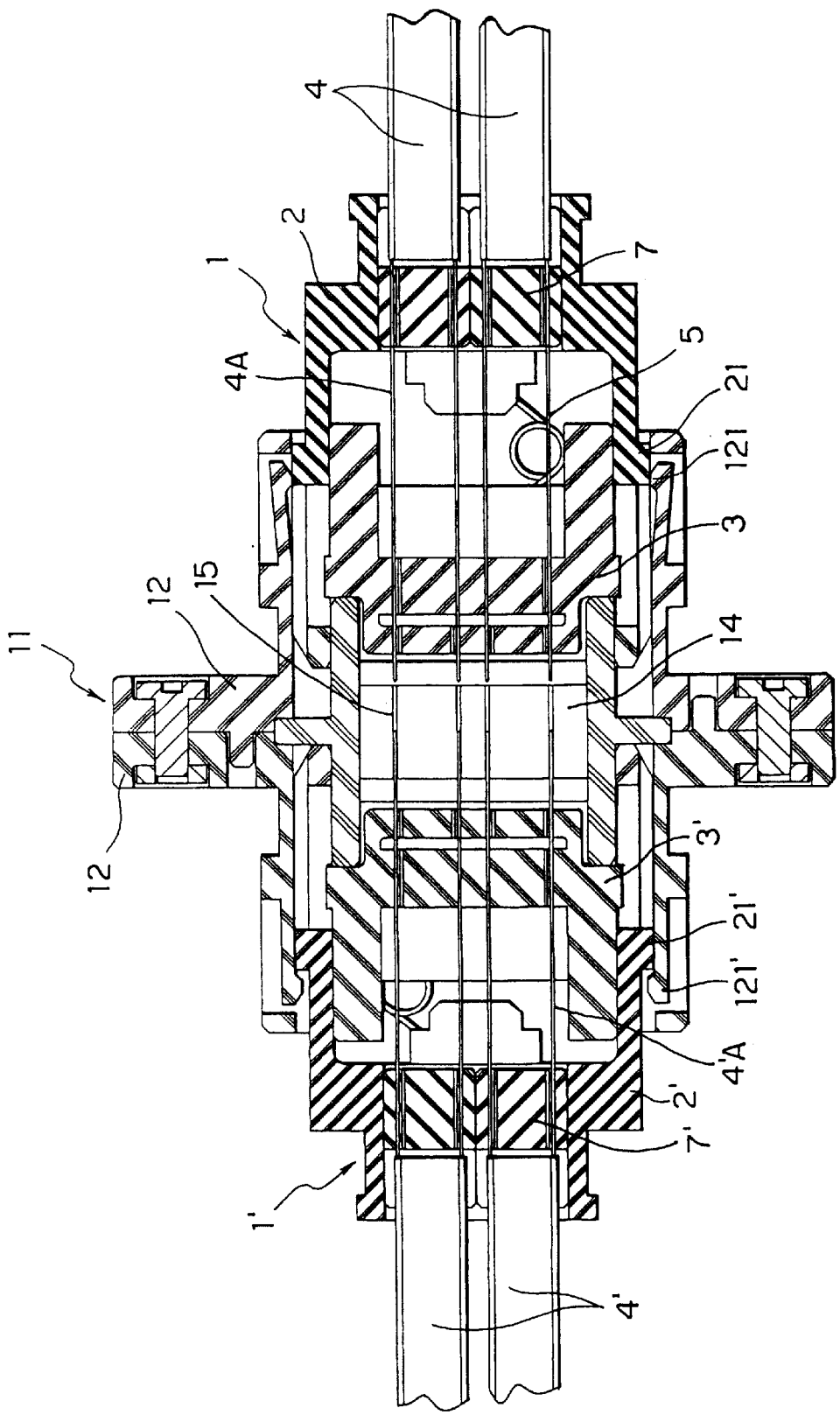
FIG. 22 is a horizontal sectional view showing the state of the optical fiber connector shown in FIG. 20 just before the complete connection thereof.
Figure 23:
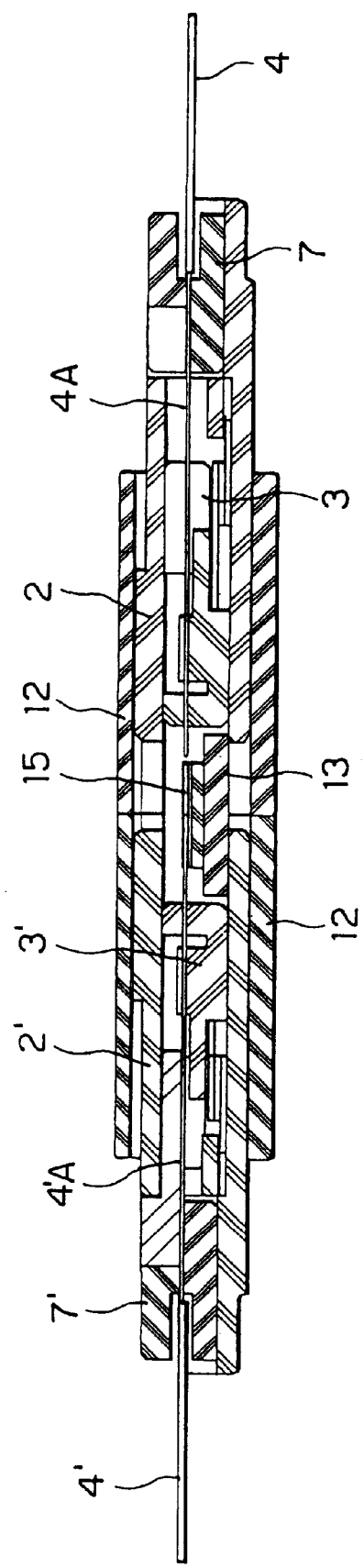
FIG. 23 is a vertical sectional view showing the state of the optical fiber connector shown in FIG. 20 just before the complete connection thereof.
Figure 24:
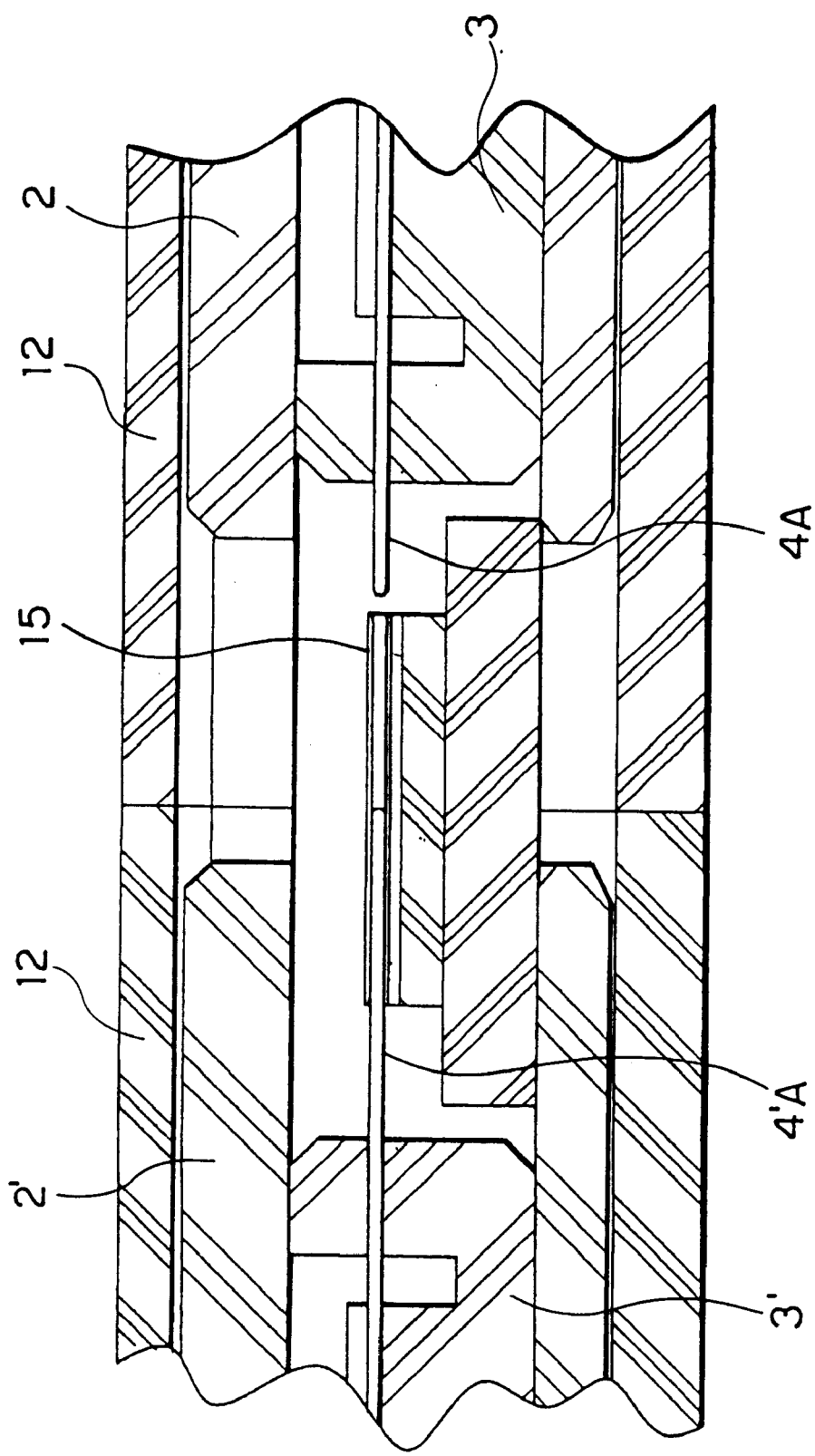
FIG. 24 is an enlarged view of the main part shown in FIG. 23.

In the optical fiber connector, the optical connector plug 1 is connected to the adapter 11 in the foregoing manner, and the optical connector plug 1' is also connected to the adapter 11 in the same manner. The connected state is shown in FIGS. 22 to 24. As shown in FIG. 22, an outer member 2 (2') of the optical connector plug 1 (1') is provided with engaging portions 21 (21'), and each of the outer members 12 of the adapter 11 is provided with elastic engaging straps 121 (121'). Through engagement between the engaging portions 21 (21') and the engaging straps 121 (121'), the optical connector plug 1 (1') can be provisionally fixed to the adapter 11.

Figure 25:
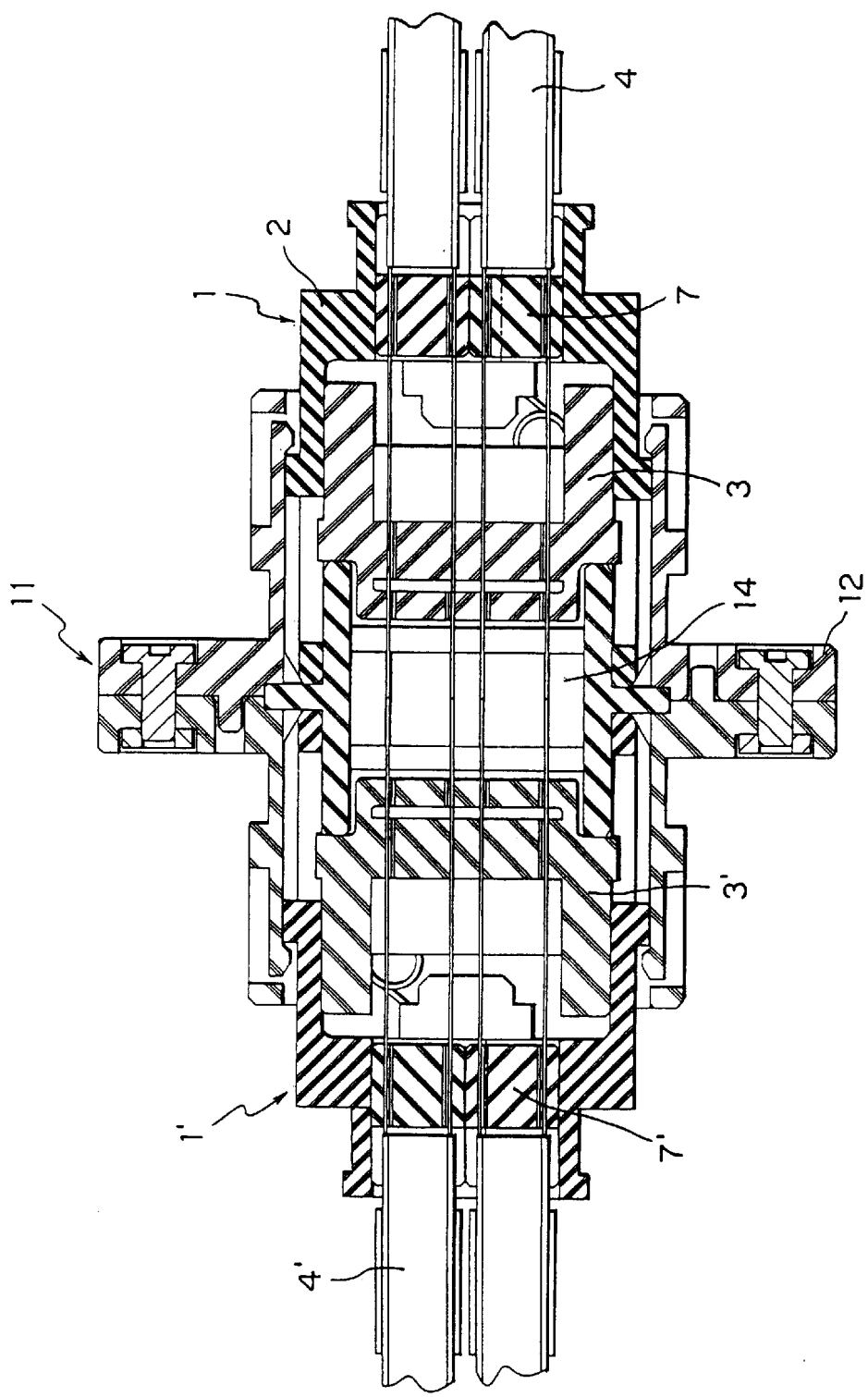
FIG. 25 is a horizontal sectional view showing the completely connected state of the optical fiber connector shown in FIG. 20.
Figure 26:
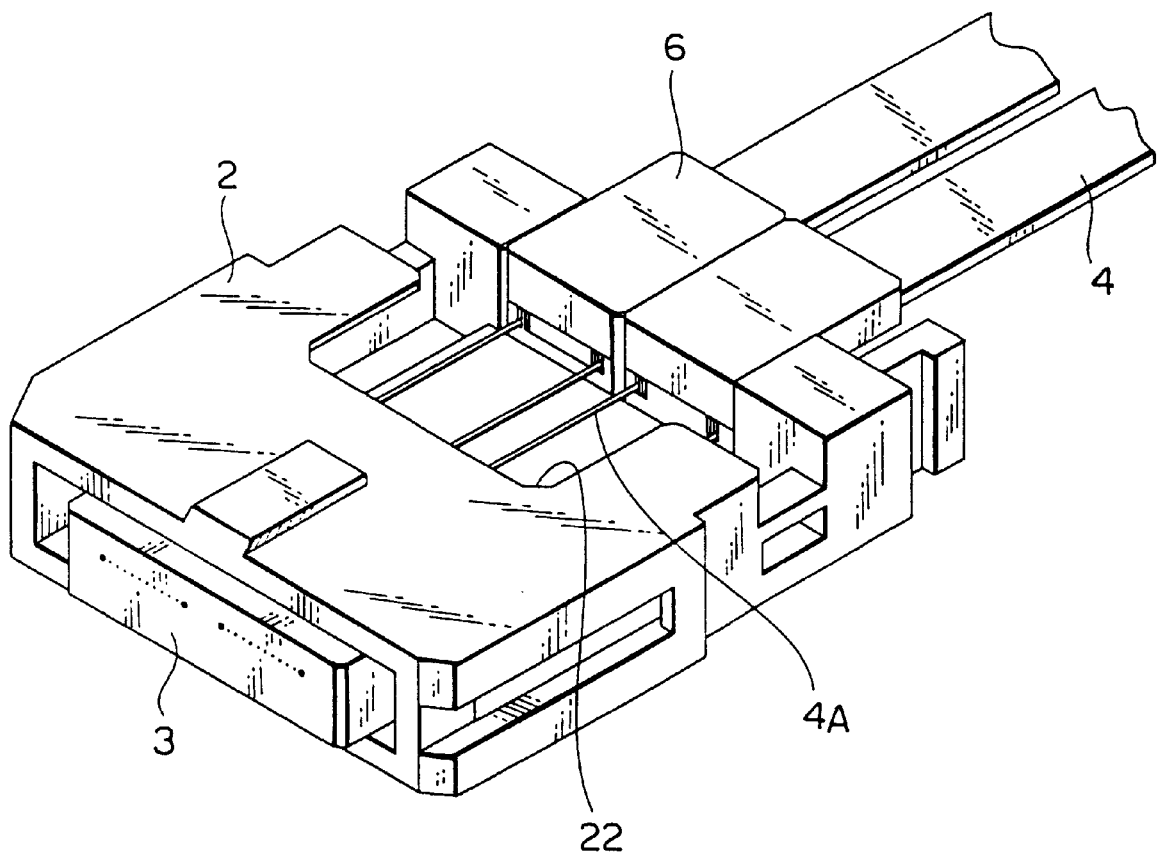
FIG. 26 is a perspective view of an optical connector plug used in an optical fiber connector according to a fourth embodiment of the present invention.
Figure 27:
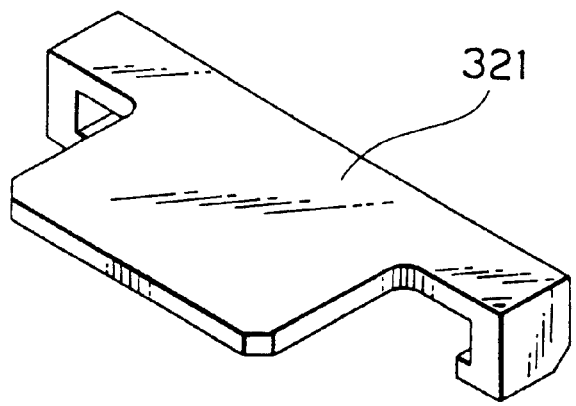
FIG. 27 is a perspective view of a fitting piece used in the optical connector plug shown in FIG. 26.

In FIG. 25, the state wherein the optical connector plugs 1 and 1' are finally connected together via the adapter 11. By allowing the optical fibers in one of the optical connector plugs to be bent in the state shown in FIG. 25, a contact force between end surfaces of the optical fibers can be obtained from a buckling load generated by bending of the optical fibers.

Also in the optical fiber connector of the third embodiment, positioning between the optical fibers and the adapter can be implemented stably. Since the positioning between the optical fibers in the optical connector plug and the aligning member in the adapter can be stably carried out, it is applicable to the narrow-pitch multi-fiber connector. Further, by using the inner periphery of the outer member of the optical connector plug as an aligning or positioning guide, the optical connector plug can be reduced in size.

With reference to FIGS. 26 to 34, the description will be made as regards an optical fiber connector according to a fourth embodiment of the present invention. Similar parts are designated by like reference numerals.

Figure 28:
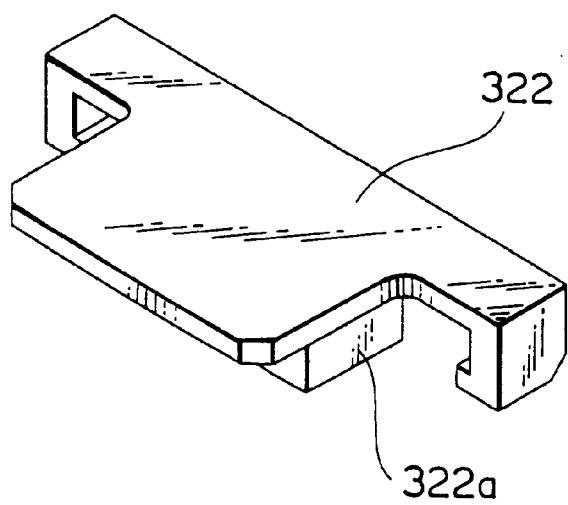
FIG. 28 is a perspective view of another fitting piece used in the optical connector plug shown in FIG. 26.
Figure 29:
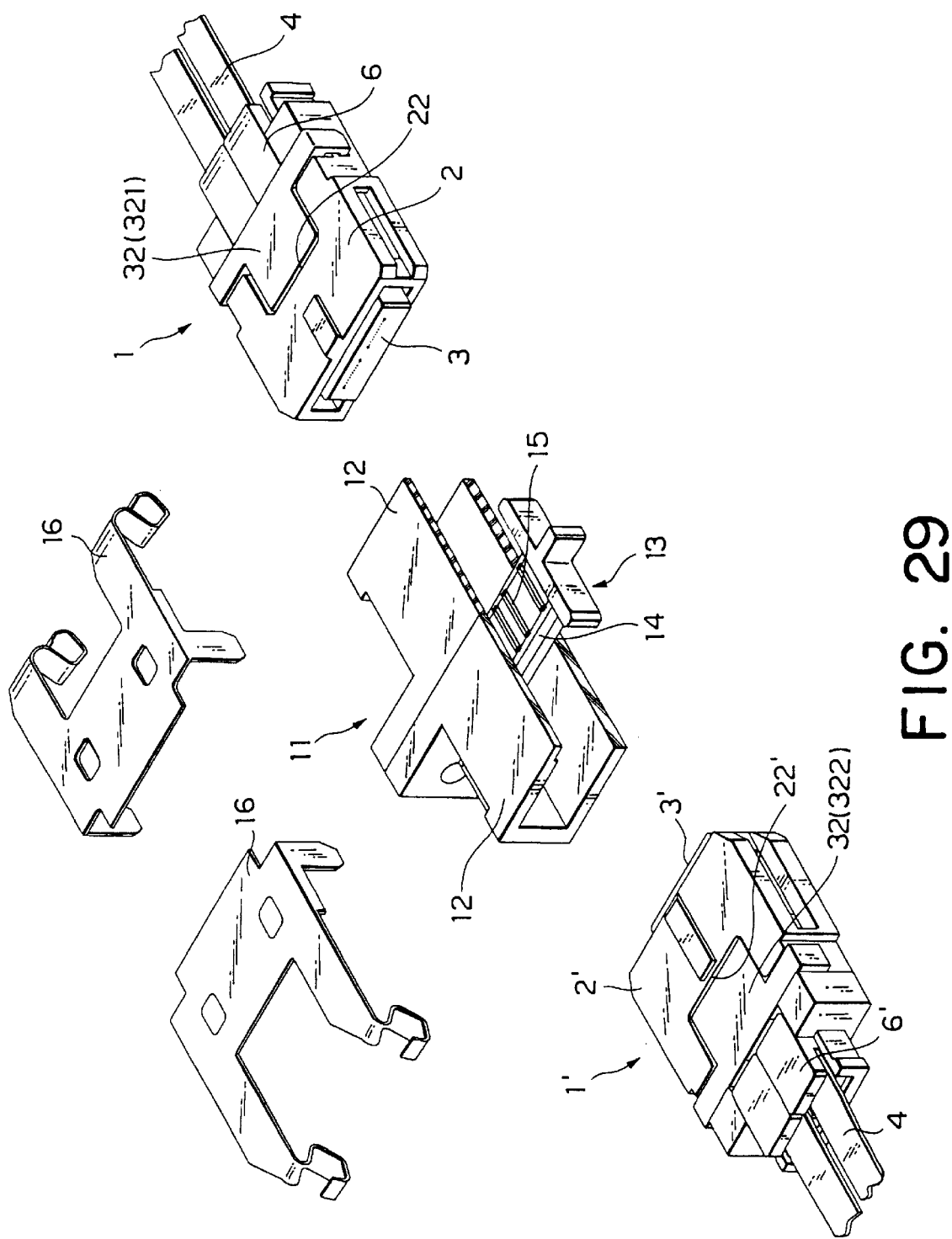
FIG. 29 is a partly-sectioned perspective view showing an example wherein two optical connector plugs each having the structure shown in FIG. 26 are connected via an adapter.

In the optical fiber connector, a concave portion 22 is provided on an outer member 2, and a fitting piece 32 is detachably held in the concave portion 22. As the fitting piece 32, either of a first fitting piece 321 shown in FIG. 27 and a second fitting piece 322 shown in FIG. 28 is used. As described later, the fitting piece 321 has a structure which does not press a portion of each of optical fibers 4A between clamp members 6 and an aligning member 3 when the fitting piece 321 is fitted in the concave portion 22 of the outer member 2. On the other hand, in the same state, the fitting piece 322 has a structure which presses the portion of each optical fiber 4A between the clamp members 6 and the aligning member 3 so as to hold such a portion of each optical fiber 4A substantially in a linear fashion.

Figure 30:
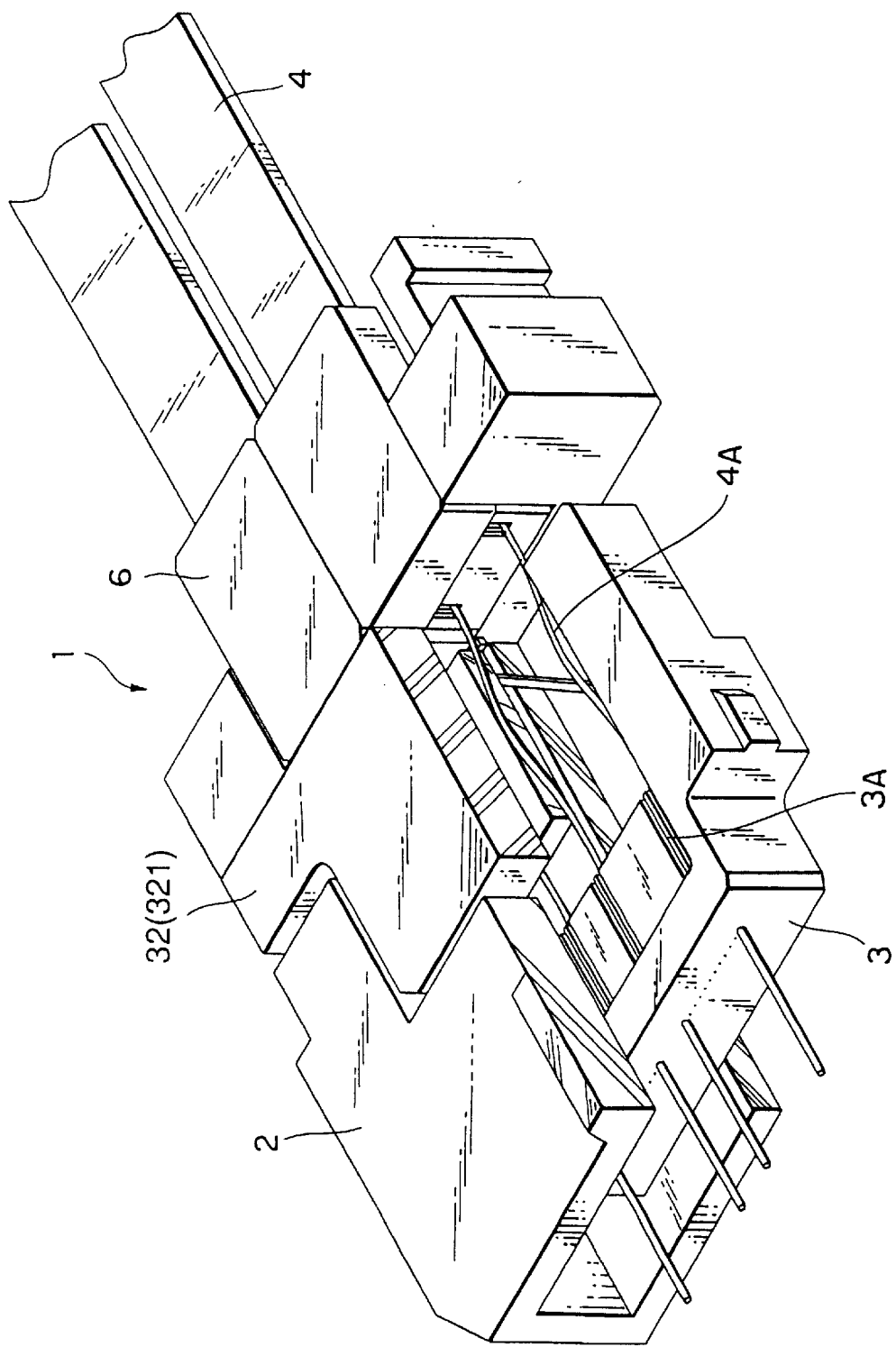
FIG. 30 is a partly-sectioned perspective view showing the state wherein optical fibers are bent in the optical connector plug using the fitting piece shown in FIG. 27.

In the optical fiber connector of the fourth embodiment, the fitting piece 321 is fitted in the optical connector plug 1, while the fitting piece 322 is fitted in the optical connector plug 1'. As shown in FIG. 30, since the fitting piece 321 does not press the portion of each optical fiber 4A between the clamp members 6 and the aligning member 3 in the optical connector plug 1, each optical fiber 4A is bent between the clamp members 6 and the aligning member 3.

Figure 31:
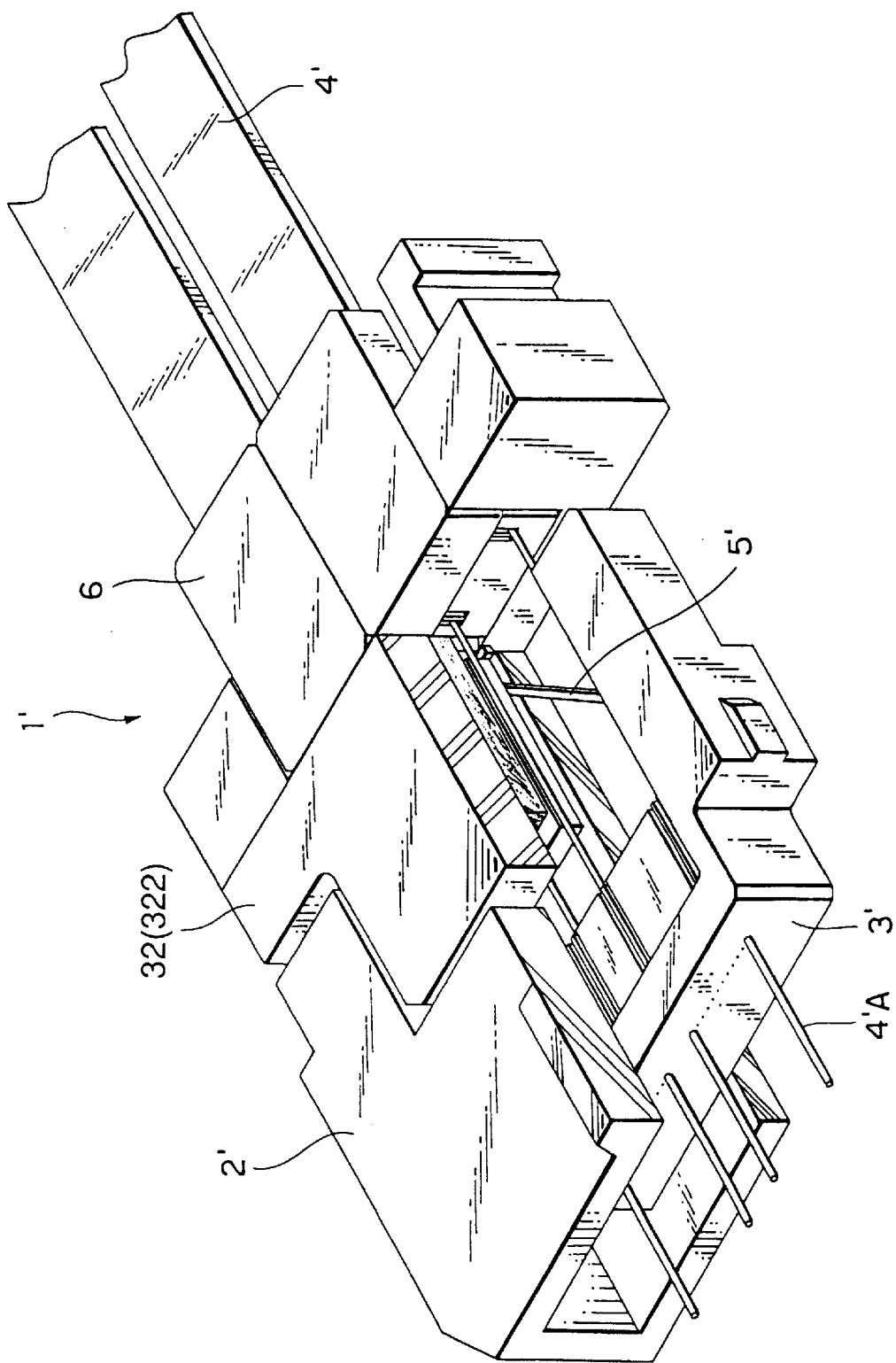
FIG. 31 is a partly-sectioned perspective view showing the state wherein optical fibers are not bent in the optical connector plug using the fitting piece shown in FIG. 28.
Figure 32:
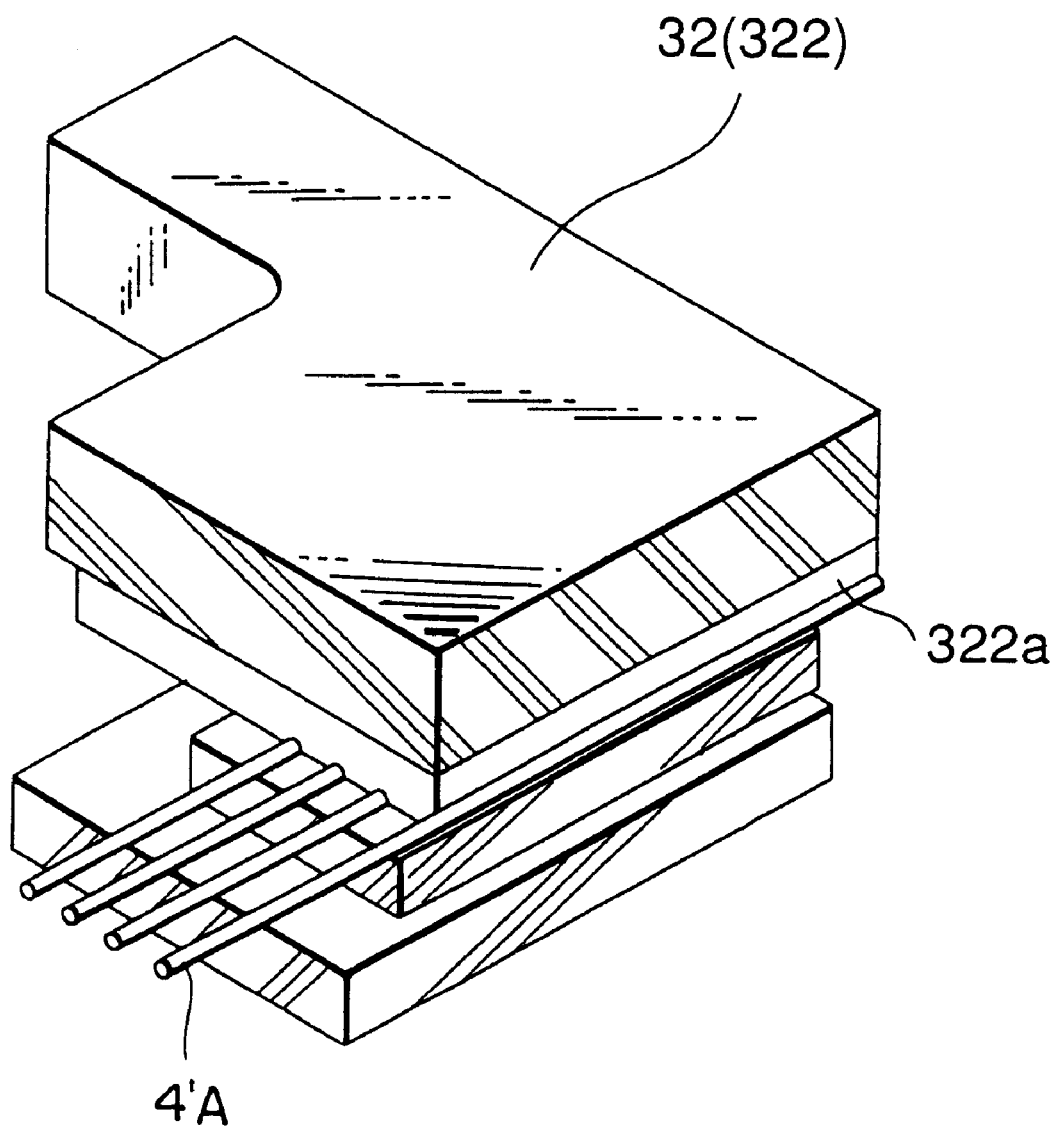
FIG. 32 is a perspective view of the main part shown in FIG. 31.

On the other hand, as shown in FIGS. 31 and 32, the fitting piece 322 presses a portion of each of optical fibers 4'A between clamp members 6' and an aligning member 3' so as to hold such a portion of each optical fiber 4'A substantially in a linear fashion in the optical connector plug 1'. The fitting piece 322 is provided with an elastic member 322a at the underside thereof, i.e. at the optical fiber pressing side. By providing such an elastic member 322a, the pressing of the optical fibers 4'A can be reliably achieved due to elastic deformation of the elastic member 322a.

According to the optical fiber connector in the fourth embodiment, the fitting pieces 321 and 322 are detachably held in the concave portions 22 and 22' of the outer members 2 and 2' in the optical connector plugs 1 and 1', respectively. By changing between the fitting pieces 321 and 322 in view of the fitting state of the optical connector plugs upon assembling the optical fiber connector, bending of the optical fibers can be generated in either one of the optical connector plugs or in both of them so as to obtain an adequate buckling load.

Figure 33:
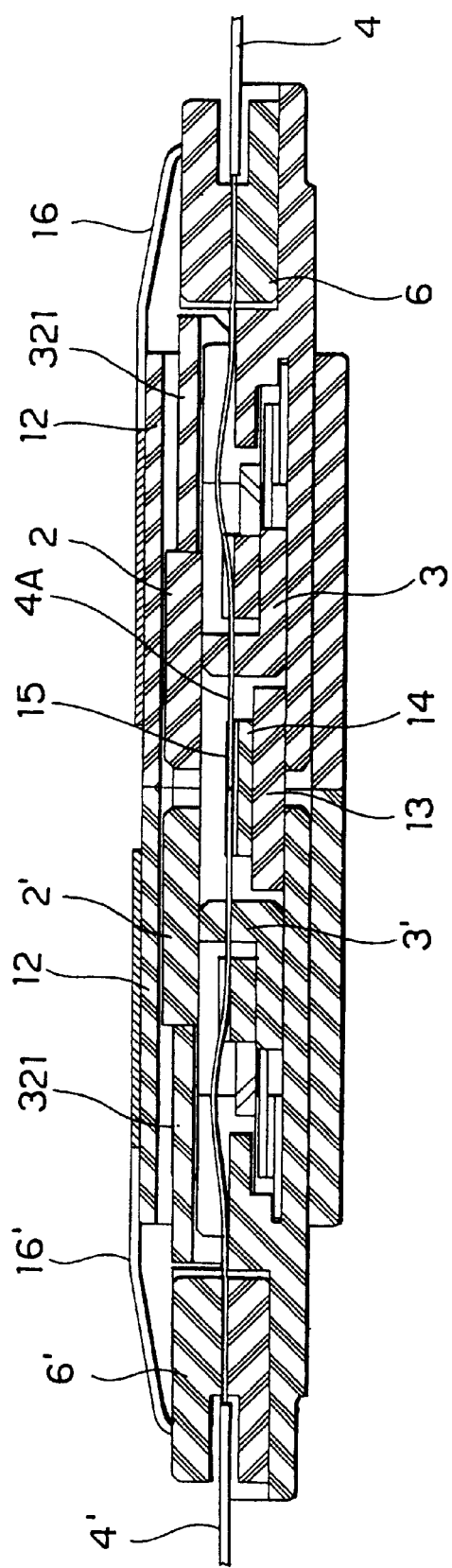
FIG. 33 is a vertical sectional view showing the state wherein the optical connector plugs both using the fitting pieces shown in FIG. 27 are connected via the adapter.

In an example shown in FIG. 33, the fitting pieces 321 are used both in the optical connector plugs 1 and 1'. Accordingly, the optical fibers 4A and 4'A are both bent to produce a buckling load so that the end surfaces of the optical fibers 4A and 4'A abut each other with a large contact force.

Figure 34:
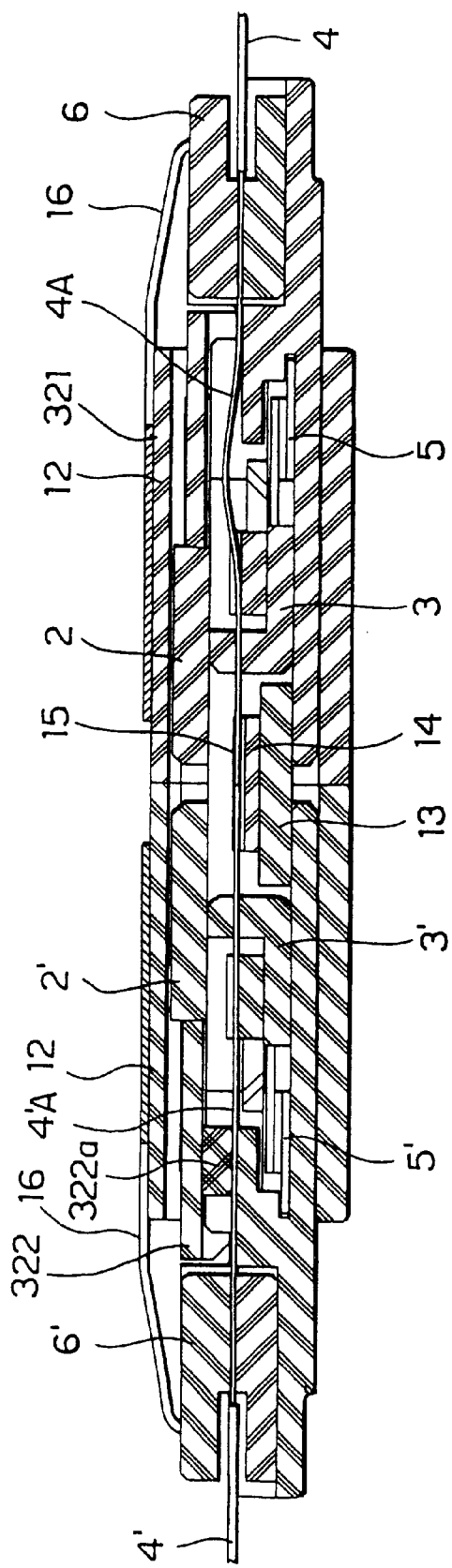
FIG. 34 is a vertical sectional view showing the state wherein the optical connector plug using the fitting piece shown in FIG. 27 and the optical connector plug using the fitting piece shown in FIG. 28 are connected via the adapter.

On the other hand, in an example shown in FIG. 34, the fitting piece 321 is used in the optical connector plug 1 while the fitting piece 322 is used in the optical connector plug 1', so that only the optical fibers in the optical connector plug 1 are subjected to bending.

Since the optical connector plugs 1 and 1' in the fourth embodiment can be produced from the same parts except the fitting pieces, the parts can be shared between the optical connector plugs so that the corresponding cost reduction can be realized.

While the present invention has been described in terms of the preferred embodiments, the invention is not to be limited thereto, but can be embodied in various ways without departing from the principle of the invention as defined in the appended claims.

What is claimed is:

1. An optical fiber connector for connecting an optical fiber to a counterpart optical fiber by abutting a connecting end of said optical fiber against a connecting end of said counterpart optical fiber in a given direction while bending said optical fiber at a portion thereof, said connector comprising:

an outer member which holds a portion of said optical fiber remote from the connecting end of said optical fiber;

an aligning member which is held by said outer member so as to be movable in said given direction and in a direction opposite to said given direction, said aligning member positioning the connecting end of said optical fiber;

an urging member which urges said aligning member in said given direction, said aligning member being moved, when connecting said optical fiber to said counterpart optical fiber, in the direction opposite to said given direction against an urging force applied by said urging member so that the connecting end of said optical fiber is projected from said aligning member; and an adapter to be fitted to said outer member, said adapter comprising an aligning member for receiving therein the connecting end of said optical fiber for alignment thereof and, upon fitting of said outer member and said adapter, said adapter moving the aforementioned aligning member in a direction opposite to said given direction against the urging force applied by said urging member.

2. An optical fiber connector as claimed in claim 1, wherein a connecting-side end surface of said aligning member is located on the same plane as a connecting-side end surface of said outer member before connecting said optical fiber to said counterpart optical fiber.

3. An optical fiber connector as claimed in claim 1, wherein a connecting-side end surface of said aligning member is projected from a connecting-side end surface of said outer member before connecting said optical fiber to said counterpart optical fiber.

4. An optical fiber connector as claimed in claim 1, wherein the connecting end of said optical fiber is retreated from an connecting-side end surface of said aligning member before connecting said optical fiber to said counterpart optical fiber.

5. An optical fiber connector as claimed in claim 1, wherein said urging member is made of metal.

6. An optical fiber connector as claimed in claim 1, wherein said urging member is made of resin.

7. An optical fiber connector as claimed in claim 1, wherein said urging member has a shape of a torsion coil.

8. An optical fiber connector as claimed in claim 1, wherein said urging member has a shape of an expansion coil.

9. An optical fiber connector as claimed in claim 1, wherein said urging member has a plate shape.

10. An optical fiber connector as claimed in claim 1, wherein said adapter is guided by an inner periphery of said outer member when moving the aforementioned aligning member in the direction opposite to said given direction.

11. An optical fiber connector as claimed in claim 1, further comprising a fitting piece which is attached to said outer member so as to contact said optical fiber to control the bending of said optical fiber.

12. An optical fiber connector as claimed in claim 11, wherein said fitting piece is detachable relative to said outer member.

13. An optical fiber connector as claimed in claim 11, wherein said fitting piece has an elastic member which contacts said optical fiber.

14. An optical fiber connector comprising a first optical connector plug and an adapter for connecting said first optical connector plug to a second optical connector plug, said first optical connector plug comprising:

outer members which hold optical fibers;

a first aligning member which performs positioning of said optical fiber at a connecting-side end of said outer member; and a spring which urges said first aligning member in a first direction, said adapter comprising a microsleeve aligning member which receives connecting ends of said optical fibers for alignment thereof, upon a fitting of said first optical connector plug to said adapter, along an inner periphery of said outer member to a given position in a second direction opposite to said first direction and said optical fiber is pushed into said microsleeve so that the end inserted into said microsleeve are in abuttment.

15. An optical fiber connector comprising a first and a second optical connector plug each having an optical fiber, an adapter having microsleeves for connecting said first and second optical connector plugs via said adapter, wherein a contact force between an end surface of the optical fiber of the first optical connector plug and an end surface of the optical fiber of the second optical connector plug is obtained from a buckling load caused by a bending of at least one of said optical fibers, each of said first and second optical connector plugs comprising:

a clamp member which firmly holds a first portion of the optical fiber other than a tip portion thereof including said end surface;

a first outer member which holds said clamp member; and a fitting piece which is detachably held by said first outer member, said adapter comprising:

said microsleeve which slidably holds the tip portion of the optical fibers in alignment.

\* \* \* \* \*